US011522924B2

(12) United States Patent
Wang et al.

(10) Patent No.: US 11,522,924 B2
(45) Date of Patent: Dec. 6, 2022

(54) NOTIFICATIONS REGARDING UPDATES TO COLLABORATIVE CONTENT

(71) Applicant: Microsoft Technology Licensing, LLC, Redmond, WA (US)

(72) Inventors: Vegar Skjaerven Wang, Tromsø (NO); Jon Meling, Tromsø (NO); Bernhard Kohlmeier, Seattle, WA (US); Madeline Schuster Kleiner, Mercer Island, WA (US); Jan Heier Johansen, Tromsø (NO); Torbjørn Helvik, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/243,285

(22) Filed: Apr. 28, 2021

(65) Prior Publication Data

US 2022/0353307 A1 Nov. 3, 2022

(51) Int. Cl.
*G06F 15/16* (2006.01)
*H04L 65/401* (2022.01)
(Continued)

(52) U.S. Cl.
CPC ...... *H04L 65/4015* (2013.01); *G06F 11/3438* (2013.01); *G06F 16/176* (2019.01); *G06N 20/00* (2019.01)

(58) Field of Classification Search
CPC ... H04L 65/4015; G06N 20/00; G06F 16/176; G06F 11/3438
(Continued)

(56) References Cited

U.S. PATENT DOCUMENTS 6,507,845 B1   1/2003  Cohen et al.
7,853,610 B2 * 12/2010  Hirsch ............... G06F 40/143
                                              707/769
(Continued)

FOREIGN PATENT DOCUMENTS

WO   2016081532 A1   5/2016
WO   2018102235 A1   6/2018

OTHER PUBLICATIONS

"International Search Report and Written Opinion Issued in PCT Application No. PCT/US21/022863", dated Jun. 14, 2021, 10 Pages.
(Continued)

*Primary Examiner* — Moustafa M Meky
(74) *Attorney, Agent, or Firm* — NovoTechIP International PLLC

(57) ABSTRACT

A method and system for intelligently notifying collaborators of activity on collaborative content include receiving a first indication of a first collaboration activity performed on a first document by a first collaborator among a plurality of first collaborators associated with the first document and responsive to receiving the first indication, obtaining first activity information for the first document comprising the first collaborative activity and one or more second collaborative activities performed on the first document. The method and system determine a lifecycle stage of the first document, analyze the first activity information and the lifecycle stage of the first document to identify one or more second collaborators among the plurality of first collaborators associated with the first document to notify of the first collaborative activity, and provide for displaying the first collaboration activity to the one or more second collaborators.

20 Claims, 18 Drawing Sheets

(51) Int. Cl.
  *G06N 20/00* (2019.01)
  *G06F 11/34* (2006.01)
  *G06F 16/176* (2019.01)

(58) Field of Classification Search
  USPC .......................................................... 709/205
  See application file for complete search history.

(56) References Cited

U.S. PATENT DOCUMENTS

| | | | | |
|---|---|---|---|---|
| 7,870,150 | B2* | 1/2011 | Hirsch | G06F 40/137 |
| | | | | 707/778 |
| 8,108,779 | B1* | 1/2012 | Rein | G06F 16/40 |
| | | | | 715/733 |
| 9,436,742 | B1 | 9/2016 | Hammad et al. | |
| 10,042,615 | B2* | 8/2018 | Fredrickson | G06Q 10/10 |
| 10,042,616 | B2* | 8/2018 | Fredrickson | G06Q 10/10 |
| 11,138,534 | B1 | 10/2021 | Kuhn et al. | |
| 2005/0071328 | A1 | 3/2005 | Lawrence | |
| 2005/0278302 | A1 | 12/2005 | Ritter | |
| 2007/0033187 | A1 | 2/2007 | Friedman et al. | |
| 2007/0088690 | A1 | 4/2007 | Wiggen et al. | |
| 2008/0091656 | A1* | 4/2008 | Charnock | G06F 16/358 |
| | | | | 707/E17.093 |
| 2008/0215616 | A1* | 9/2008 | Hirsch | G06F 40/143 |
| 2008/0281835 | A1* | 11/2008 | Hirsch | G06F 40/137 |
| 2009/0241183 | A1 | 9/2009 | Boss et al. | |
| 2011/0066955 | A1 | 3/2011 | Olson et al. | |
| 2014/0033009 | A1* | 1/2014 | Rein | G06F 16/40 |
| | | | | 715/764 |
| 2016/0371352 | A1 | 12/2016 | Kohlmeier et al. | |
| 2016/0379129 | A1 | 12/2016 | Assem Aly Salama et al. | |
| 2017/0139550 | A1 | 5/2017 | Milvaney et al. | |
| 2018/0025084 | A1 | 1/2018 | Conlan et al. | |
| 2018/0060325 | A1 | 3/2018 | Taylor et al. | |
| 2018/0115603 | A1 | 4/2018 | Hu et al. | |
| 2020/0067997 | A1* | 2/2020 | Hardee | G06Q 10/101 |
| 2021/0118034 | A1 | 4/2021 | Indrakanti et al. | |
| 2021/0224296 | A1 | 7/2021 | Kohlmeier et al. | |
| 2021/0294809 | A1 | 9/2021 | Helvik et al. | |
| 2021/0365466 | A1 | 11/2021 | Kleiner et al. | |
| 2022/0222279 | A1 | 7/2022 | Kohlmeier et al. | |
| 2022/0284031 | A1 | 9/2022 | Helvik et al. | |

OTHER PUBLICATIONS

"Non Final Office Action Issued in U.S. Appl. No. 16/881,830", dated Jun. 23, 2021, 14 Pages.

"International Search Report and Written Opinion Issued in PCT Application No. PCT/US2020/064980", dated Mar. 3, 2021, 10 Pages.

"International Search Report & Written Opinion issued in PCT Application No. PCT/US21/015971", dated Apr. 16, 2021, 12 Pages.

"Non Final Office Action Issued in U.S. Appl. No. 16/822,877", dated Aug. 3, 2021, 10 Pages.

"Non Final Office Action Issued in U.S. Appl. No. 16/746,581", dated Jun. 30, 2021, 16 Pages.

"Final Office Action Issued in U.S. Appl. No. 16/881,830", dated Dec. 29, 2021, 17 Pages.

"Non Final Office Action Issued in U.S. Appl. No. 16/881,830", dated Apr. 26, 2022, 18 Pages.

"International Search Report & Written Opinion issued in PCT Application No. PCT/US22/023231", dated Jul. 1, 2022, 13 Pages.

* cited by examiner

| Session Start Time 210 | User ID 220 | User Activity Identifier 230 | Subject Matter 235 | Session End Time 240 |
|---|---|---|---|---|
| 2019-03-29 T 09:17:24.135Z | 3be14b38-121f-4c7a-85cf-cc5ee98f35e6 | 30002 | | 2019-03-29 T 09:23:35.115Z |
| | | 106 | | |
| | | 30010 | Air Pollution | |

FIG. 2

| File Name 310 | Level of Activity 320 | Lifecycle Stage 330 | User Categories 340 | User Alias 345 | Session Date/Time 350 | Session Duration 360 | User ID 390 | Subject Matters 325 | Document Sections 335 |
|---|---|---|---|---|---|---|---|---|---|
| Machine Learning For Image Processing | Active | Reading | Reader | User F | 2020-01-29 T 09:23:35 | 3:25:16 | 43g21c3a-477f | A, B, C | 1, 2, 3, 4, 5 |
| | Active | Reading | Reader | User E | 2020-01-25 T 11:35:22 | 1:06:19 | 94e1t123-855e | A, B, C | 1, 2, 3, 4, 5 |
| | Active | Reviewing | Reviewer | User D | 2019-12-21 T 10:15:42 | 0:25:45 | 7fb14b38-116d | A, B | 1, 2, 3 |
| | Active | Editing | Editor | User C | 2019-12-18 T 12:34:15 | 1:34:11 | 6s983485-2a1c | A, C | 1, 2, 4, 5 |
| | Very Active | Authoring | Author | User B | 2019-12-15 T 10:15:42 | 4:16:19 | 8b599c38-1d1b | A, B, C | 1, 2, 3, 5 |
| | Very Active | Authoring | Author | User A | 2019-12-13 T 11:45:16 | 3:25:45 | 3be14b38-121a | A, B, C | 1, 2, 3, 4 |
| | Active | Creating | Creator | User A | 2019-12-13 T 10:15:44 | | 3be14b38-121a | A, B, C | 1, 2, 3, 4 |

| File Name 310 | Lifecycle Stage 330 | User Categories 340 | User Alias 345 | User ID 390 |
|---|---|---|---|---|
| Machine Learning For Image Processing | Creating | Creator | User A | 3be14b38-121a |
| | Authoring | Author | User A | 3be14b38-121a |
| | Authoring | Author | User B | 8b599c38-1d1b |
| | Editing | Editor | User C | 6s983485-2a1c |
| | Reviewing | Reviewer | User D | 7fb14b38-116d |
| | Reading | Reader | User E | 94e1t123-855e |
| | Reading | Reader | User F | 43g21c3a-477f |

| User Alias 345 | User ID 390 | Subject Matter 315 | Expertise Level 355 |
|---|---|---|---|
| User A | 3be14b38-121a | A | 10 |
| User A | 3be14b38-121a | B | 8 |
| User A | 8b599c38-1d1b | C | 7 |
| User B | 6s983485-2a1c | A | 7.5 |
| User B | 7fb14b38-116d | B | 9.1 |
| User B | 94e1t123-855e | C | 10 |
| User C | 43g21c3a-477f | A | 9 |

| User Alias 345 | User ID 390 | Subject Matter 315 | Lifecycle Stage 330 | Frequency 375 |
|---|---|---|---|---|
| User A | 3be14b38-121a | A | Authoring | 8 |
| User A | 3be14b38-121a | B | Authoring | 5 |
| User A | 8b599c38-1d1b | C | Authoring | 3 |
| User B | 6s983485-2a1c | A | Reviewing | 2 |
| User B | 7fb14b38-116d | B | Authoring | 7 |
| User B | 94e1t123-855e | C | Authoring | 11 |
| User C | 43g21c3a-477f | A | Editing | 9 |

FIG. 3D

It appears you are preparing a document on Machine Learning and Image Processing.

The following Subject Matter Experts in Machine Learning and Image Processing may be able to assist you in authoring the document:

☐ Name: Andrea Anderson
　 Team: ML Dev Team

☐ Name: J.L. Okuye
　 Team: Image Processing Team

☐ Name: Sai Patel
　 Team: ML R&D Team

Would you like to invite one or more of these subject matter experts to assist in preparing this document? If so, please click the invite button below and we will walk you through selecting one or more experts to invite and preparing a message to send to each invited expert.

405 — Invite　　410 — Cancel

It appears you are preparing a document on Machine Learning and Image Processing.

The following potential collaborators have recently assisted in reviewing and finalizing documents related to this subject matter:

Name: Patricia Chen
Role: Technical Writer / Communications Specialist

Name: Ana Delgado
Role: Image Processing Team Lead

Name: Franklin Everett
Role: Technology Evangelist

Would you like to invite one or more of these potential collaborators to help review and finalize this document? If so, please click the invite button below and we will walk you through selecting one or more experts to invite and preparing a message to send to each invited collaborator.

405 — Invite
410 — Cancel

Invite Collaborator

Draft a message below to invite the following user to collaborate on your project:

Name: Andrea Anderson
Team: ML Dev Team

Dear Andrea,

My team is authoring a paper on using Machine Learning to provide improved object recognition in the camera systems of autonomous / semi-autonomous vehicles. We would like invite you to collaborate with us on this paper based on your experience in Machine Learning and image processing.

Please let me know if you may be interested and we can set up a meeting to discuss this project.

Kind regards,

425 — Send Invitation    430 — Cancel

Search

The following documents on which you have collaborated have activity. You may click the "Open" button to open the document to see the most recent activity on the document.

Sort By: Most Recent (1) Machine Learning Presentation -- modified on March 15, 2021 at 11:45 am
Recent activities by other collaborators: Editing by G. Shinn, Reviewed by A. Shu and M. Okuye
Your most recent contribution: Authoring on March 10, 2021 at 9:23 am
[Open in PowerPoint] [Details]

(2) Monthly Project Budget Projections -- modified on March 14, 2021 at 3:09 pm
Activities: Editing by K. Hansen
Your most recent contribution: Commenting on March 10, 2021 at 10:55 am
[Open in Excel] [Details]

(3) White Paper: Improved ML Training Techniques -- modified on March 12, 2021 at 7:09 am
Activities: Authoring by E. Johansen
Your most recent contribution: Authoring on March 11, 2021 at 5:45pm
[Open in Word] [Details]

(4) Functional Specification for Image Processing Engine -- modified on March 12, 2021 at 12:59 pm
Activities: Commenting by Sai Patel
Your most recent contribution: Editing on March 11, 2021 at 4:35 pm
[Open in Word] [Details]

(5) UI Design Specification for Project X -- modified on March 9, 2021 at 11:16 am
Activities: Authoring by A. Feldman
Your most recent contribution: Creating and Authoring on March 7, 2021 at 6:45 pm
[Open in Word] [Details]

Search

The following documents on which you have collaborated have activity. You may click the "Open" button to open the document to see the most recent activity on the document.

Sort By: Most Recent (1) White Paper: Improved ML Training Techniques -- modified on March 12, 2021 at 7:09 am
Activities: Authoring by E. Johansen
Your most recent contribution: Authoring on March 11, 2021 at 5:45pm

[Open in Word] [Details]

(2) Functional Specification for Image Processing Engine -- modified on March 12, 2021 at 12:59 pm
Activities: Commenting by Sai Patel
Your most recent contribution: Editing on March 11, 2021 at 4:35 pm

[Open in Word] [Details]

(3) UI Design Specification for Project X -- modified on March 9, 2021 at 11:16 am
Activities: Authoring by A. Feldman
Your most recent contribution: Creating and Authoring on March 7, 2021 at 6:45 pm

[Open in Word] [Details]

FIG. 4F

Collaborative Activity Details

The following is a detailed history of contributions made by collaborators to your selected document.

Functional Specification for Image Processing Engine – modified on March 12, 2021 at 12:59 pm (1) Created on March 5, 2021 at 12:05 pm by T. Gutierrez
(2) Authoring on March 5, 2021 at 12:48 pm by T. Gutierrez
(3) Authoring on March 6, 2021 at 9:45 am by A. Eriksson
(4) Authoring on March 6, 2021 at 1:12 pm by you.
(5) Editing on March 6, 2021 at 4:45 pm by T. Gutierrez.
(6) Reviewing on March 7, 2021 at 10:22 am by S. Pai.
(7) Commenting on March 7, 2021 at 2:21 pm by T. Gutierrez
(8) Commenting on March 8, 2021 at 8:07 am by R. Smythe
(9) Editing on March 6, 2021 by A. Eriksson

[Open Document]

NOTIFICATIONS REGARDING UPDATES TO COLLABORATIVE CONTENT

BACKGROUND

A document may go through multiple lifecycle stages, during each one of which users may contribute to the creation, preparation, review and/or formatting of the content of the document. In enterprises, collaborative work environments, and schools, each of these lifecycle stages may involve various actions performed by multiple users. During each lifecycle stage, an author of the document may obtain the assistance of collaborators to facilitate the document reaching a more mature state. These actions may vary depending on the lifecycle stage of the document. During a "writing stage" of the document, the author may obtain the assistance of collaborators who may help create the content of the document. Similarly, the document may enter a "reviewing stage" in which the author may obtain the assistance of collaborators who understand the subject matter of the document to review, edit and/or provide comments on the content of the document. Collaborators may contribute to multiple documents that may be in various lifecycle stages. A collaborator may struggle to keep track of the state of these documents and the various contributions that have been made to these documents by other collaborators. This may lead to frustration and inefficiency as the collaborator struggles to keep track of which documents may require the attention of the collaborator. Hence, there is a need for improved systems and methods of intelligently tracking and keeping collaborators informed of changes to collaborative content that may require attention.

SUMMARY

An example data processing system according to the disclosure includes a processor and a memory in communication with the processor. The memory includes executable instructions that, when executed by the processor, cause the processor to perform functions of: receiving a first indication of a first collaboration activity performed on a first document by a first collaborator among a plurality of first collaborators associated with the first document; responsive to receiving the first indication, obtaining first activity information for the first document comprising the first collaborative activity and one or more second collaborative activities performed on the first document; determining a lifecycle stage of the first document; analyzing the first activity information and the lifecycle stage of the first document to identify one or more second collaborators among the plurality of first collaborators associated with the first document to notify of the first collaborative activity; and providing for displaying the first collaboration activity to the one or more second collaborators.

An example method for intelligently notifying collaborators of activity on collaborative content according to the disclosure includes receiving a first indication of a first collaboration activity performed on a first document by a first collaborator among a plurality of first collaborators associated with the first document, responsive to receiving the first indication, obtaining first activity information for the first document comprising the first collaborative activity and one or more second collaborative activities performed on the first document; determining a lifecycle stage of the first document, analyzing the first activity information and the lifecycle stage of the first document to identify one or more second collaborators among the plurality of first collaborators associated with the first document to notify of the first collaborative activity, and providing for displaying the first collaboration activity to the one or more second collaborators.

An example computer readable storage media according to the disclosure on which are stored instructions that, when executed, cause a programmable device to perform functions of receiving a first indication of a first collaboration activity performed on a first document by a first collaborator among a plurality of first collaborators associated with the first document, responsive to receiving the first indication, obtaining first activity information for the first document comprising the first collaborative activity and one or more second collaborative activities performed on the first document, determining a lifecycle stage of the first document, analyzing the first activity information and the lifecycle stage of the first document to identify one or more second collaborators among the plurality of first collaborators associated with the first document to notify of the first collaborative activity, and providing for displaying the first collaboration activity to the one or more second collaborators.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an example data structure for keeping track of user activity in a document.

FIGS. 3A-3B illustrate example properties associated with a document that may be used to provide intelligent identification of potential collaborators.

FIG. 3C illustrates example properties associated with collaborator(s) and/or potential collaborator(s).

FIG. 3D illustrates additional example properties associated with collaborator(s) and/or potential collaborator(s).

FIGS. 4A-4D are example graphical user interface (GUI) displays for presenting potential collaborator information for a document, and for inviting one or more potential collaborator(s) to collaborate on the document.

FIGS. 4E-4G are example graphical user interface (GUI) displays for presenting collaborator activity information for documents for which the user is a collaborator, for enabling the user to obtain details of the collaborator activity, and to open a document on which there has been collaborator activity.

DETAILED DESCRIPTION

Figure 1A:
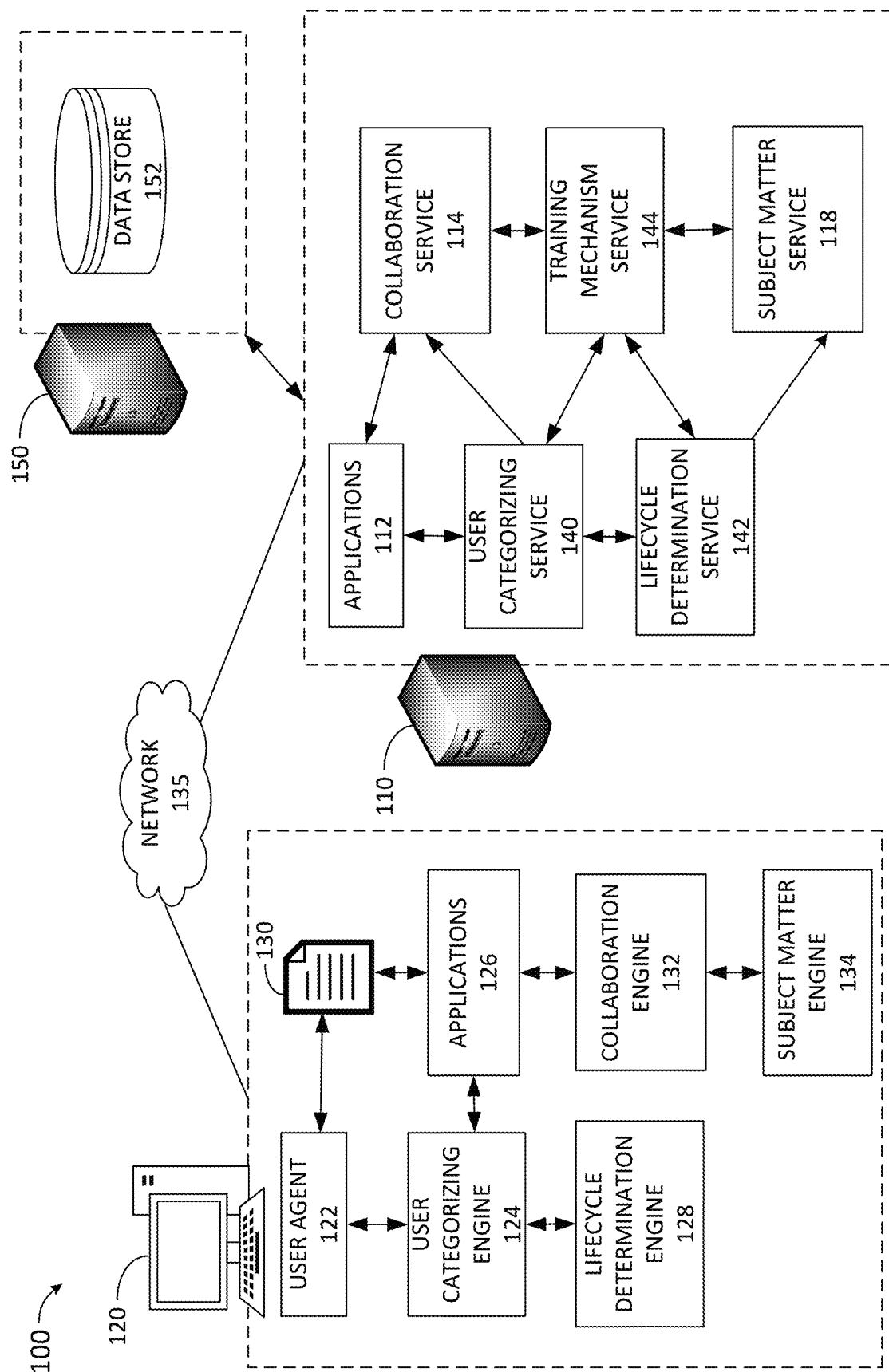
FIGS. 1A-1C illustrate an example system in which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

A document may go through multiple lifecycle stages, during each one of which one or more users may collaborate on the creation, preparation, review and/or formatting of the content of the document. The document may include, but is not limited to, Microsoft Word documents, Microsoft Excel spreadsheets, Microsoft PowerPoint presentations, Microsoft Visio drawings, Microsoft Fluid Framework components, and/or documents or components generated by other types of word processing, spreadsheet, presentation, drawing or other software applications. The document may have a specific format. The format of the document may vary depending upon the subject matter of the document and how the document is intended to be used. For example, a white paper or journal article may be authored using a word processing application and saved in an electronic file format associated with that word processing application. In contrast, a presentation may be authored using a presentation application and saved in an electronic file format associated with the presentation application. The types of content that may be authored are not limited to these specific examples and may include other types of content, such as but not limited to images, videos, charts, and/or interactive content. Furthermore, a document may include more than one segment, section, or component, and collaborators may contribute to one or more segments, sections, or components of the document. Moreover, different sets of collaborators may contribute to different segments, sections, or components of the document. Some components, such as Microsoft Fluid Framework components, may be associated with multiple documents across multiple platforms. For example, a component may be included in a word processing document, in a presentation, and may be shared in an email with one or more collaborators. Collaborators may make contributions to the component across multiple platforms and these contributions may be reflected in real-time or nearly real-time in the each of the documents that include the component across each of the multiple platforms. Other types of file formats may be used to author other types of documents. Each type of document may be associated with specific lifecycle stages and actions that correspond with each lifecycle stage.

In enterprises, collaborative work environments, and schools, each lifecycle stage of the document may involve various actions performed by multiple users. During these lifecycle stages, an author of the document may obtain the assistance of collaborators. For example, during a "writing lifecycle stage" of the document, the author may seek the assistance of collaborators to create content for the document and thereby expand upon the existing content of the document. For another example, during a "reviewing lifecycle stage" of the document, the author may obtain the assistance of collaborators with a relevant experience to review the document.

A "potential collaborator," as used herein, refers to someone who may contribute to the development of the document at various lifecycle stages of the document. An author or creator of a document may invite a potential collaborator to contribute to the document. A "collaborator," as used herein, may refer to a potential collaborator who has accepted an invitation to contribute to the development of the document and/or a potential collaborator who has contributed to the document. The term collaborator may also refer to a former potential collaborator who has contributed to the document. In some implementations, potential collaborators may not receive an express invitation to be a collaborator to contribute content to a document. For example, a document may be made available to a group of potential collaborators who are part of an enterprise, organization, or school. The potential collaborators may not receive an express invitation from an author or creator of the document to contribute to the document but may nonetheless be permitted to contribute to the document. For example, the document may be stored on a network, managed by a document management system or by a collaboration platform to which the potential collaborators have access.

A user may be a collaborator on numerous documents and may contribute to the documents at one or more lifecycle stages of the document. The user may struggle to keep track of the state of each of these documents and whether the document requires the attention of the user in response to the contributions that have been made to the document. The user may be part of an organization, enterprise, or school with numerous operational entities. The operational entities may include project teams, divisions, research units, business units, departments, or classes. The user may collaborate on documents associated with multiple operational entities. The user may struggle to manually track the progress of each these documents by individually accessing and opening each of these documents to determine whether there have been changes to the documents on which the user is a collaborator. However, this approach is inefficient and may consume significant processing, memory, and/or network resources. Further, this approach may not be very accurate and may lead to missed opportunities to contribute to the document as an author or collaborator of the document may inadvertently overlook important changes to a document. To address these technical problems and others, in an example, the present application provides a technical solution for tracking collaborators' contributions to documents for which the user is a collaborator and for presenting recommendations to the user for documents that may require the user's attention based on collaborator activity.

To this end, the technical solution provided herein may utilize the lifecycle stage of a collaborative document when predicting whether changes to the collaborative document may require the attention of the user. The lifecycle stage of the document may be determined based on usage signal data collected by one or more application(s) used to author, access and/or modify the document. The usage signal data may include information indicative of how user(s) interact with the document. Additionally, or alternatively, the usage signal data may include (i) information identifying a user that created the document, (ii) the date and time the document was created, and/or (iii) information identifying the application used to create the document including version information. Additionally, or alternatively, the usage signal data may include information about (i) users who performed operations on the document between the document's creation and last access/modification, (ii) the types of operations performed on the document, and/or (iii) the types of content accessed and/or modified in the document. The usage signal data may be used to train one or more machine learning (ML) models. The ML models may analyze the usage signal data collected for the document to determine whether a particular user needs the attention of one or more users who are collaborators associated with that document.

The benefits provided by these solutions include more user-friendly applications enabling authors of documents to increase their efficiency by intelligently recommending to user documents which may require the user's attention. The determination of whether the user's attention is required may be determined based, at least in part, on the stages of the lifecycle at which the user has contributed to the document, the types of contributions that have been made by other collaborators, the current lifecycle stage of the document, and/or other factors which may be used to determine whether the user's attention to the document may be required. The technical solutions of the present application can, therefore, improve user productivity and efficiency, and reduce processing, memory, and/or network resources required to identify documents on which the user is a collaborator and require user attention.

FIG. 1A illustrates an example system 100, in which aspects of this disclosure may be implemented. The system 100 includes a server 110, a client device 120, a network 135, and a storage server 150. The server 110 may contain and/or execute a user categorizing service 140, a lifecycle determination service 142, a collaboration service 114, a training mechanism service 144, and a subject matter service 118. The server 110 may operate as a shared resource server located at an enterprise accessible by various computer client devices such as the client device 120. The server 110 may also operate as a cloud-based server for offering global user categorizing services, lifecycle determination services, and/or collaboration services. Although shown as one server, the server 110 may represent multiple servers for performing various operations. For example, the server 110 may include one or more processing servers for performing the operations of the user categorizing service 140, the lifecycle determination service 142, the collaboration service 114, the training mechanism service 144, and the subject matter service 118.

The user categorizing service 140 may identify a user category or categories for a collaborator to a document based on activities performed on the document by the collaborator. In an example, a collaborator who creates a new document falls into a "creator" user category. The same collaborator may also add new content to the document, and thus, fall into an "author" user category as well. Other example user categories include editor, reviewer, moderator, or reader. The user categories may be extensible based on user scenarios. For example, a user may be collaborating on a document in a highly regulated industry, and the user may be assigned to an "approver" user category for the document which may not be available or required in other user scenarios that are not as highly regulated. As described in detail with respect to FIG. 1B, the operations of the user categorizing service 140 may include receiving a usage signal from a document. The usage signal may include detailed information about the types of activities performed on the document by a user within a given time period. Based on the types of activities performed on the document, the user categorizing service 140 may identify one or more user categories for the user. The identified user categories may be stored in association with the document and/or in a graph associated with the document and may be used to identify potential collaborators for the document. The user categorizing service 140 may provide the identified user categories to the lifecycle determination service 142.

The lifecycle determination service 142 may receive information relating to the identified user categories and provide intelligent determination of a document's lifecycle stage. The lifecycle determination service 142 may also determine an appropriate activity level for the document based on the activities received as part of the usage signal. The lifecycle determination service 142 may provide the identified lifecycle stage and/or activity level to the collaboration service 114. The collaboration service 114 may use this information to identify potential collaborator(s) that are appropriate to the current lifecycle stage and/or activity level of the document. For example, if the current lifecycle stage of the document is in the reviewing stage, the collaboration service 114 may use this information to identify potential collaborator(s) that have experience reviewing documents. The collaboration service 114 may also use the lifecycle stage and/or activity level of the document to determine whether a collaborator's attention may be required in response to contributions that other collaborators have made to the document.

The subject matter service 118 may provide intelligent determination of the subject matter or matters of a document. A document may include content associated with more than one subject matter, and the subject matter service 118 may produce a list of the subject matter or matters associated with the document. In one implementation, the subject matter service 118 may determine content of the subject matter(s) of the document based on the content of the document, metadata, and/or other document information. To this end, the subject matter service 118 may implement an ML model that is trained to receive the document, document metadata, and/or other document information as input, and to output a prediction of the subject matter(s) of the document. The determination of subject matter or matters of a document is discussed in detail in U.S. patent application Ser. No. 16/917,655, entitled "Intelligently Identifying Collaborators for a Document," and filed on Jun. 30, 2020 (referred to hereinafter as "the '655 Application"), the entirety of which is incorporated herein by reference.

The collaboration service 114 may conduct intelligent identification of potential collaborators for a document. The collaboration service 114 may do so based at least in part on factors including: (i) the subject matter of the document, (ii) the lifecycle stage of the document, and/or (iii) collaborator-specific information associated with each of the one or more potential collaborators. In one implementation, the potential collaborators may be identified based on the specific lifecycle stage of the document. For example, the potential collaborators sought at the active authoring or writing lifecycle stage may be different from potential collaborators who may be sought during a reviewing stage. The potential collaborators sought at an active authoring stage may be subject matter experts on topics related to the subject matter of the document and may have authored other documents related to the subject matter. In contrast, the potential collaborators sought at the reviewing stage may have experience reviewing and refining content of documents but may not necessarily be subject matter experts. Other potential collaborators may have experience commenting on content of documents and/or responding to comments added to the document by other users.

The collaboration service 114 may also identify the potential collaborators based on collaborator-specific information associated with each of the one or more potential collaborators. The collaborator-specific information associated with the one or more potential collaborators may include: (i) information indicative of one or more subject matters in which the potential collaborator is a subject matter expert, (ii) information indicative of a level of expertise of the potential collaborator in a subject matter, and/or (iii) information indicative of the lifecycle stages at which the potential collaborator typically contributes to documents. The information indicative of the level of expertise of the potential collaborator in the subject matter may be determined based on a self-assessed level of expertise provided by the potential collaborator, and/or based on a crowdsourced assessment of subject matter expertise derived from inputs received from other users. The identification of potential collaborators is discussed in detail in the '655 Application.

The collaboration service 114 may also track the contributions being made to documents by collaborators and may predict whether a collaborator should be notified of contributions by other collaborators to the document. The collaboration service 114 may analyze the contributions that have been made to a document, the lifecycle stage of the document, and which collaborators contributed at which lifecycle stage of the document to predict whether a particular collaborator may need to act in response to contributions to the document. The collaboration service 114 may provide proactive notice to the user that the collaborative content requires their attention, which the user may otherwise inadvertently overlook if they did not continually monitor the status of the documents on which they are a collaborator. The collaboration service 114 may provide notifications to the user regarding the activity predicted to require the attention of the user. To this end, the collaboration service 114 may be configured to cause the collaborative activity information to be presented to the user via a graphical user interface presented by of the applications 112 or 126. Examples of such user interfaces are shown in FIGS. 4E-4G.

The collaboration service 114 may be configured to identify one or more collaborators for a document, such as the electronic document 130. The collaboration service 114 may consider factors such as the lifecycle stage of the document, the activity level of the document, the contributions made by the collaborators and/or the lifecycle stage at which the collaborators contributed to the electronic document, how long a particular collaborator contributed to the document during a collaboration session, and/or other information discussed in the examples which follow.

FIG. 3C illustrates an example data structure 300C, such as a database table, containing collaborator-specific information associated with a set of potential collaborators. Each entry may include a user alias 345 and/or a user ID 390 associated with the collaborator. The user alias 345 may be a username, email address, or other identifier associated with the potential collaborator. The user ID 390 may be a unique identifier associated with each collaborator. The user ID 390 may be generated by the collaboration service 114. The collaboration service 114 may generate the user ID when the collaborator is added to a document for the first time.

The subject matter column 315 identifies a subject matter in which the collaborator has been determined to have subject matter expertise by the collaboration service 114. The estimated expertise level determined by the collaboration service 114 is included in the expertise level column 355. The expertise level in the example data structure 300C is represented by a numerical rating from zero to ten, where zero represents no subject matter expertise and ten represents a high subject matter expertise. Other implementations may use other rating systems and/or representations of the subject matter expertise of the collaborator or potential collaborator.

The collaborator-specific information may include a frequency with which the potential collaborator contributes at each lifecycle stage. The frequency information may be broken down by subject matter to facilitate identifying potential collaborator(s) who contribute frequently at a particular lifecycle stage for a particular subject matter. FIG. 3D illustrates an example data structure 300D, such as a database table, containing collaborator-specific information associated with a set of potential collaborators. Each entry may include a user alias 345 and/or a user ID 390 associated with the potential collaborator as described with respect to FIG. 3C. Each entry may include frequency information 375 indicating a frequency with which each potential collaborator contributed to a specific lifecycle stage 330 of a document or documents and the subject matter 315 associated with the contribution. The frequency information 375 provides a count of the number of times that the potential collaborator contributed at that specific lifecycle stage 330 of a document or documents for a specific subject matter 315.

The collaborator-specific information may also be used once collaborators have been invited to contribute to a document to predict whether a particular collaborator may be interested in being notified of contributions that have been made to the document and/or to other electronic documents based on the frequency with which the collaborator has contributed at a particular lifecycle stage of the document. Collaborators who frequently contribute to documents at a particular lifecycle stage may be more likely to direct their attention to the changes made to the document by other collaborators at that lifecycle stage of the document than other collaborators who never or infrequently contribute to documents in that particular lifecycle stage.

In one implementation, the collaborator-specific information may be derived from the usage signal information associated with documents to which the potential collaborator has contributed in the past. In another implementation, the collaborator-specific information may be derived from one or more remote or local services, such as a directory service, a collaboration service, a communication service, a productivity service background framework, an email service, a social media service, and/or other service that may be searched for contact information for potential collaborators. This includes, but is not limited to, Microsoft Teams, Microsoft SharePoint, Microsoft Yammer, LinkedIn, Skype for Business, and/or Microsoft Outlook contacts. Collaborator-specific information may be obtained from one or more remote or local services. The collaborator-specific information may include, but is not limited to, the role of the potential collaborator with the organization, enterprise, or school; project information for projects on which the potential collaborator is currently participating or has been a participant; interest groups or committees to which the potential collaborator belongs or has belonged; and/or other information. Subject matter expertise of the potential collaborator may be inferred from such collaborator-specific information which may indicate that collaborator has experience and/or interest in one or more subject matters.

After identifying the one or more potential collaborators, the collaboration service 114 may rank the identified potential collaborators. The factors used to rank the potential collaborators may be similar to those described above for identifying the potential collaborators. For example, these factors may include, among others, the subject matter expertise of the potential collaborators, the lifecycle stages at which the potential collaborators typically contribute, the current lifecycle stage of the document for which collaborators are being sought and/or the activity levels of the potential collaborators at each lifecycle stage. The ranked list of the potential collaborators may be displayed to the user. To this end, the collaboration service 114 may cause a user interface (UI) to be displayed on the client device 120. Example implementations of such a UI are shown in FIGS. 4A-4D. The ranking of potential collaborators for presentation to a user is discussed in further detail in the '655 Application.

In collecting and storing any user activity data, potential collaborator data, and collaborator data, care must be taken to comply with privacy guidelines and regulations. For example, user data may be collected and/or stored in such a way that it does not include user identifying information and is stored no longer than necessary. For example, the collaborator-specific information included in the data structure 300C may be kept confidential by the collaboration service 114 and may not be disclosed to users seeking potential collaborators and/or to the potential collaborators. Furthermore, options may be provided to seek consent (e.g., opt-in) from users for collection and use of user data, to enable users to opt-out of data collection, and/or to allow users to view and/or correct collected data. Users may opt-out of the collaboration service so that they are not included in the potential collaborators recommended to other users. Users may also be provided with options to opt into participating in the collaboration service. The collaboration service may permit users to opt into participating in in the collaboration service for particular subject matter(s), particular project(s), and/or for a particular operational entity or entities. Users may also be provided with an opportunity to selectively turn on or off participation in the collaboration service based on workload and/or other preferences.

The server 110 may be connected to or include the storage server 150 containing a data store 152. The data store 152 may function as a repository in which documents, collaborative activity data for the documents, and/or data sets (e.g., training data sets) may be stored. One or more ML models used by the user categorizing service 140, the lifecycle determination service 142, and the collaboration service 114 may be trained by a training mechanism service 144. The training mechanism service 144 may use training data sets stored in the data store 152 to provide initial and ongoing training for each of the models. Alternatively and/or additionally, the training mechanism service 144 may use training data sets from elsewhere. This may include training data such as knowledge from public repositories (e.g., Internet), knowledge from other enterprise sources, or knowledge from other pre-trained mechanisms. In one implementation, the training mechanism service 144 may use labeled training data from the data store 152 to train each of the models via deep neural network(s) or other types of ML models. The initial training may be performed in an offline stage. Additionally and/or alternatively, the one or more ML models may be trained using batch learning.

It should be noted that the ML model(s) categorizing the user activities, determining lifecycle stages, determining subject matters, and/or identifying collaborators may be hosted locally on the client device 120 or remotely, e.g., in the cloud. In one implementation, some ML models are hosted locally, while others are stored remotely. This enables the client device 120 to provide some categorization, lifecycle determination, subject matter determination, and collaborator identification, even when the client device 120 is not connected to a network.

The client device 120 may be connected to the server 110 via a network 135. The network 135 may be a wired or wireless network(s) or a combination of wired and wireless networks that connect one or more elements of the system 100. In some embodiments, the client device 120 may be a personal or handheld computing device having or being connected to input/output elements that enable a user to interact with an electronic document 130 on the client device 120 via, for example, a UI displayed on the client device 120. Examples of suitable client devices 120 include but are not limited to personal computers, desktop computers, laptop computers, mobile telephones, smart phones, tablets, phablets, digital assistant devices, smart watches, wearable computers, gaming devices/computers, televisions, and the like. The internal hardware structure of the client device 120 is discussed in greater detail regarding FIGS. 6 and 7.

The client device 120 may include one or more applications 126. The applications 126 may be a computer program that configures the client device 120 to be responsive to a user input. This allows a user to interactively generate, edit and/or view the electronic document 130. The electronic document 130 and the term document used herein can be representative of any electronic document or component that can be created by a computing device and/or stored in a storage medium. Examples of documents include but are not limited to word processing documents, presentations, spreadsheets, websites (e.g., SharePoint sites), digital drawings, media files, components thereof, and the like. The electronic document 130 may be stored locally on the client device 120, stored in the data store 152 or stored in a different data store and/or server.

The applications 126 may process the electronic document 130, in response to user input through an input device, to create, view, and/or modify the content of the electronic document 130, to enable the user to search for potential collaborator(s) to contribute to the electronic document 130, and/or to view contributions made by other collaborators to the electronic document 130 and/or to other electronic documents for which the user is a collaborator. The applications 126 may also display or otherwise present display data to the user. The display data may include a graphical user interface (GUI) displaying the content of the electronic document 130. The GUI of the application 126 may allow the user to search for potential collaborators to contribute to various lifecycle stages of the document, to invite one or more identified potential collaborator(s) to contribute to the document, to create tasks associated with the document that identify work to be done on the electronic document 130, and/or to assign tasks to collaborators. The assignment of tasks to collaborators may include assignment of tasks to both potential collaborators who have not yet accepted an invitation to collaborate on the document and potential collaborators who have accepted the invitation to collaborate on the document. The GUI of application 126 may allow the user to reassign tasks from the potential collaborators who choose not to accept the invitation to collaborators who have accepted the invitation to collaborate on the document. The GUI of application 126 may also allow the user to reassign tasks from the potential collaborators who have not completed tasks in a particular timeframe to other potential collaborators. Examples of suitable applications 126 include, but are not limited to, a document management application, a file sharing application, a word processing application, a presentation application, a note taking application, a text editing application, an email application, a spreadsheet application, a desktop publishing application, a digital drawing application and a communications application.

The applications 126 may also include an application hub or productivity hub. The application hub or productivity hub may provide streamlined interface for accessing documents associated with multiple types of applications. The application hub or productivity hub may provide a user with a GUI from which the user may access document on which the user has recently accessed, created, and/or modified. The application hub or productivity hub may provide a means for accessing, creating, and/or modifying collaborative electronic documents. The GUI of the applications 126 may also allow the user to view contributions made to document on which the user is a collaborator. Examples of such GUIs are shown in FIGS. 4E-4G and are discussed in detail below.

The server 110 may also be connected to or include one or more applications 112. The applications 112 may be representative of applications that enable a user to interactively generate, edit and/or view an electronic document 130 and/or to enable the user to search for potential collaborator(s) to contribute to the electronic document 130. As such, applications 112 may host at least a portion of the functionality of the collaboration service 114. Examples of suitable applications include, but are not limited to a word processing application, a presentation application, a note taking application, a text editing application, an email application, a spreadsheet application, a desktop publishing application, a digital drawing application, and a communications application.

The client device 120 may also access the applications 112 that are run on the server 110 and provided via an online service, as described above. In one implementation, the applications 112 may communicate via the network 135 with a user agent 122, such as a browser, executing on the client device 120. The user agent 122 may provide a UI that allows the user to interact with application content and electronic documents stored in the data store 152. The user agent 122 may also provide a UI that enables the user to view a list of one or more documents. In some examples, the user agent 122 may be a dedicated client application that provides a UI to access documents stored in the data store 152 and/or in various other data stores. The user agent 122 may be configured to allow the user to create, view and/or modify the content of the documents using the applications 112 in a similar manner as in the application 126 described above. The applications 112 may also provide UI elements that allow the user to search for potential collaborators, invite potential collaborators to contribute to the document, and/or assign tasks to potential collaborators as described with respect to the applications 126. The applications 112 may also provide UI elements that allow the user to view contributions that collaborators have made to documents on which the user is a collaborator.

The client device 120 may also include a user categorizing engine 124. The user categorizing engine 124 may identify a user category or categories for a collaborator to a document, such as the electronic document 130, based on activities performed on the document by the collaborator. In an example, the user categorizing engine 124 may operate with the applications 126 to provide local user categorizing services. For example, when the client device 120 is offline, the user categorizing engine 124 may operate in a similar manner as that of the user categorizing service 140 and may use one or more local repositories to provide categorization of user activities for a document. In one implementation, enterprise-based repositories that are cached locally may also provide local user categorization.

The client device 120 may also include a lifecycle determination engine 128. The lifecycle determination engine 128 may be configured to determine the current lifecycle stage and/or activity level of a document, such as the electronic document 130. The lifecycle determination engine 128 may use the amounts and/or types of activities performed on the document within a given time period along with the identified user roles (e.g., received from the local user categorizing engine 124 and/or the user categorizing service 140) to determine the current lifecycle stage and/or activity level of the document. The operations of the lifecycle determination engine 128 may be similar to the operations of the lifecycle determination service 142, described further below with respect to FIG. 1B.

Moreover, the client device 120 may include a collaboration engine 132. The collaboration engine 132 may be configured to identify potential collaborators for the electronic document 130. To achieve this, the collaboration engine 132 may conduct a search of one or more local data stores to identify potential collaborators at one or more lifecycle stages of the electronic document 130. After identifying the potential collaborators, the collaboration engine 132 may rank the identified potential collaborators. The ranking may be based at least in part on the subject matter expertise of the potential collaborators, the lifecycle stages at which the potential collaborators typically contribute and/or the activity levels associated with the potential collaborators. The collaboration engine 132 may be further configured to display the ranked potential collaborators to the user. The user may invite one or more of the potential collaborators to contribute to the electronic document 130. The operations of the collaboration engine 132 may be similar to the operations of the collaboration service 114, discussed further below with respect to FIG. 1B.

The collaboration engine 132 may also be configured to access collaborative activity information from one or more local data stores and/or from one or more remote data stores, such as but not limited to the data store 152. The collaboration engine 132 may be configured to analyze the collaborative activity information to predict whether one or more collaborators on the electronic document should be notified of the collaboration activities taking place on the document. The collaboration engine 132 may consider factors such as the lifecycle stage of the document, the activity level of the document, the contributions made by the collaborators and/or the lifecycle stage at which the collaborators contributed to the electronic document, how long a particular collaborator contributed to the document during a collaboration session, and/or other information discussed in the examples which follow when determining whether a collaborator should be notified of the collaborative activity on the document.

In one implementation, in order to identify potential collaborators, the client device 120 may include a local search service for conducting a search for potential collaborators based on information stored in a local storage medium (e.g., local memory of the client device 120, not shown). In an example, the local search service may be configured to utilize the Microsoft Graph platform to access a graph associated with the document that includes data from cloud-based services, such as but not limited to Microsoft Word, Microsoft Teams, Microsoft OneDrive, Microsoft Outlook, and/or other cloud-based services. The local search service may be configured to perform a "graph walk" of the graph associated with the document to obtain information that may be used to identify potential collaborators. The information obtained by searching and/or by performing the graph walk of the graph associated with the document may be document-specific information and/or collaborator-specific information. The search service may include a local ranking engine and/or a local search engine. Alternatively, the search service may make use of a remote ranking engine and/or a remote search engine for conducting a search of the local storage medium and/or ranking the identified potential collaborators.

The user categorizing service 140, lifecycle determination service 142, user categorizing engine 124, and lifecycle determination engine 128, may receive usage signals from documents created or edited in a variety of different types of applications 126 or 112. Once usage signals are received, the user categorizing service 140, lifecycle determination service 142, user categorizing engine 124, and lifecycle determination engine 128 may evaluate the received usage signals, regardless of the type of application they originate from, to identify appropriate user categories and/or lifecycle stages associated with the usage signals.

FIG. 18 depicts various elements included in each of the user categorizing service 140 and the collaboration service 114. The user categorizing service 140 may identify a user category or categories for a collaborator to a document based on activities performed on the document by the collaborator. This process is discussed in detail in U.S. patent application Ser. No. 16/746,581, entitled "Intelligently Identifying a User's Relationship with a Document," and filed on Jan. 17, 2020 (referred to hereinafter as "the '581 Application"), the entirety of which is incorporated herein by reference.

As discussed in the '581 Application, content creation/editing applications often provide numerous commands and/or other activities for interacting with content of a document. For example, a word processing application may include one or more commands for changing the font, changing paragraph styles, italicizing text, and the like. These commands may each be associated with an identifier, such as a toolbar command identifier (TCID). In addition to offering various commands, applications may also enable user activities such as typing, scrolling, dwelling, or other tasks that do not correspond to TCID commands. These activities may be referred to as non-command activities. Each of the commands or non-command activities provided by an application may fall into a different category of user activity. For example, commands for changing the font, paragraph, or style of the document may be associated with formatting activities, while inserting comments, replying to comments, and/or inserting text using a track-changes feature may correspond to reviewing activities.

To categorize user activities, commands and non-command activities provided by an application, such as the applications 112 and/or applications 126, may be grouped to represent various user categories. An initial set of user categories may include creators, authors, moderators, reviewers, and readers. Other categories may also be used and/or created (e.g., custom categories created for an enterprise or tenant). For example, a category may be generated for text formatters. Another category may be created for object formatters (e.g., shading, cropping, picture styles). Yet another category may be created for openers, which may include users who merely open and close a document or open a document but do not perform any activities (e.g., scrolling) and do not interact with the content of the document.

To determine user categories, data representing user commands used to interact with the content of the document may be collected and analyzed. This may involve tracking and storing (e.g., temporarily) a list of activities and commands in a local or remote data structure associated with the document to keep track of the collaborator's activity and command history. This information may be referred to as a usage signal and may be provided by the applications 112 and/or applications 126 (e.g., at the end of an active session) to the user categorizing service 140. The user categorizing service 140 may identify a user category or categories for a collaborator to a document based on the category or categories into which the activities performed on the document by the collaborator fall. For example, the user categorizing service 140 may determine that based on the user's activity and command history within the last session, the user functioned as a reviewer. Identification of the user category or categories may be made by utilizing an ML model that receives the usage signal as an input and intelligently identifies the proper user categories for each user session. The identified user category may then be returned to the applications 112, and/or applications 126, and/or to the data store 152 as a user category signal where it may be stored as metadata for the document and/or be added as new properties to the document for identifying potential collaborators for a document based at least in part on the user category. The user category signal may include the one or more user categories identified for a session in which the user was performing activity on the document. The user category signal may also be transmitted from the user categorizing service 140 and/or sent from the data store 152 to the lifecycle determination service 142. The lifecycle determination service 142 may utilize the identified user category and/or the underlying user activities to determine an appropriate lifecycle stage for the document. For example, when the identified user category is a reviewer, the lifecycle determination service 142 may determine that the current lifecycle stage of the document is in review. In an example, lifecycle stages include creation, authoring, editing, in review, and/or finalized.

Not all activities performed on a document by a collaborator may be relevant for identifying and/or ranking potential collaborators. Activities which are determined to not be relevant for identifying and/or ranking potential collaborators may be discarded. In an example, a collaborator to a document changes the magnification of the view of the document on their client device. This activity may be discarded as being irrelevant for identifying and/or ranking potential collaborators, because the activity is not indicative of a user category of the collaborator. An author, creator, reader, or reviewer may perform such an action.

The activity identifying engine 166 may determine whether a particular activity is relevant. For example, the activity identifying engine 166 may compare a list of relevant document activities against the list of user activities received as part of the usage signal to determine if any activities performed on the document are on a list of relevant document activities that should be maintained in the records associated with the document. The list of relevant document activities includes a list of activities that, if performed on the document, may be relevant for determining the lifecycle of the document. These activities may also be relevant for identifying and/or ranking potential collaborators. The list of relevant document activities may include activities such as adding new content to the document, copying and pasting content into the document, adding comments to the document, and/or editing contents of the document. The list of relevant document activities may vary from one file type to another file type. For example, cutting and pasting content in a word processing document may be considered a relevant activity, while cutting and pasting data in a spreadsheet document may not be considered a relevant activity.

After relevant document activities are identified for a session associated with the usage signal, they may be provided by the activity identifying engine 166 and may be transmitted along with, as part of, or separately from the user category signal to a storage medium such as the data store 152 for storage. Both the user category signal and the document activities may be stored for future use in identifying potential collaborators. As will be discussed in the example implementations that follow, this information may be used to identify which documents a potential collaborator has contributed to and in which lifecycle stages of the documents that contribution was made.

In addition to the user category signal, the lifecycle determination service 142 may receive activity data relating to the types and quantity of activities performed in the document within a given time period (e.g., the last active session or the last few active sessions). This data may be provided by the user categorizing service 140, the applications 112 and/or applications 126, and/or the data store 152. The lifecycle determination service 142 may use the activity data to determine a level of activity for the document. This may be done by examining the number of activities performed within a given period and determining where the activity level falls among a variety of predetermined levels of activity (e.g., non-active, low activity, active, very active, extremely active).

The levels of activity may be useful for identifying and/or ranking potential collaborators relative to this document. The rankings are document specific, and a potential collaborator may be ranked differently for different lifecycle states of a document. For example, a first potential collaborator that was very active in the authoring lifecycle stage of one or more documents may be a valuable collaborator during the authoring lifecycle stage of the document, while a second potential collaborator that was very active in the reviewing lifecycle stage of one or more documents may be valuable collaborator during the reviewing lifecycle stage of the document. In another example, if a first potential collaborator was non-active during the authoring lifecycle stage of one or more first documents but a second potential collaborator was very active during the authoring lifecycle stage of one or more second documents, then the second potential collaborator may be a more valuable collaborator during the authoring lifecycle stage of a document than the first potential collaborator.

Furthermore, potential collaborators may be ranked differently for different documents. For example, if a first document for which the subject matter is determined to be related to machine learning and a second document related to wireless communications systems, a collaborator having experience in machine learning and artificial intelligence applications may be ranked higher as a potential collaborator for the first document than for the second document based upon her experience. In another example, if a first document in an authoring stage and a second document is in a reviewing stage, a collaborator that typically contributes to collaborative documents and the reviewing stage but not the authoring stage may be ranked lower for the first document than for the second document.

To determine the level of activity, in addition to the number of activities performed, the types of activities may also be taken into consideration. Some activities may be more important than others within the context of the application. For example, in a word processing application, pressing the delete button multiple times to delete a sentence may result in a larger number of activities than pasting a paragraph into the document. However, pasting the paragraph may be more important or substantial than deleting a sentence. To address this, different weights may be assigned to each activity in an application. The weights may be predetermined or may be set by one or more ML models used to identify the importance of each activity within the application. In some embodiments, once the weights are determined, the lifecycle determination service 142 may calculate a weighted sum of the activities. The weighted sum may then be compared to predetermined activity levels (e.g., non-active, low activity, active, very active, extremely active) to determine which activity level the weighted sum falls into.

It should be noted that the level of activity may change with time. For example, a document may have been identified as very active the last time it was modified. That same document may not be used for an extended period of time after the last modification. To more accurately capture the current activity level of the document, in one implementation, a mechanism is used that considers both the level of activity and the amount of time that has passed since the last activity and updates the activity level accordingly. Once calculated and/or updated, the activity level may then be provided by the lifecycle determination service 142 to the applications 112 or to the data store 152 to be stored as metadata associated with the document.

The identified user categories, lifecycle stages and/or activity levels may then be used as inputs to enable the collaboration service 114 to identify potential collaborators who have experience contributing at particular lifecycle stage(s) of a document. In some implementations, an indication may be received from the application 112 to present a list of potential collaborators to the user. This may occur when a user launches a specific application, creates a new document in the application, and/or invokes a menu item in an application to search for potential collaborators, such as the application 112.

When such an indication is received from the application 112, the collaboration service 114 may retrieve from the user data structure 116 user-specific information associated with the user searching for potential collaborators. The user searching for potential collaborators may be an author or creator of the document. The data structure 116 may be stored locally (e.g., in the client device 120), in the data store 152 and/or in any other storage medium. The user-specific information may include information about the user searching for potential collaborators, in addition to people, teams, groups, organizations, and the like with which the user is associated. In an example, the user-specific information may include one or more people with whom the user has recently collaborated. Additional examples of the types of user-specific information that may be used to search for potential collaborators is discussed in detail in the '655 Application.

In some implementations, some of the user-specific information described above is retrieved from one or more remote or local services, such as a directory service, a collaboration service, and/or a communication service and stored in a user-specific information structure, such as the user data structure 116. Alternatively, the user-specific information may simply be retrieved from the local and/or remote services, when needed. Furthermore, as will be described with respect to the search engine 160 and ranking engine 162, user-specific information associated with the potential collaborator(s) is used to identify potential collaborator(s) and to rank the potential collaborator(s) in some implementations.

Once retrieved, the user-specific information may be supplied by the collaboration service 114 to a search engine 160 and/or ranking engine 162 to search for and identify potential collaborators. The process of searching for and ranking results is discussed in detail in U.S. patent application Ser. No. 16/822,877, entitled "Intelligent Ranking of Search Results," and filed on Mar. 18, 2020, the entirety of which is incorporated herein by reference.

The collaboration service 114 may formulate a search query to be executed by the search engine 160 to identify potential collaborators. The collaboration service 114 may formulate a search query based on the subject matter(s) of the document and/or the lifecycle stage of the document. The collaboration service 114 may obtain an indication of the subject matter(s) of the document from the subject matter service 118. The subject matter service 118 may analyze the content of the document using an ML model as described above to provide a prediction of the subject matter(s) of the document. The collaboration service 114 may obtain the lifecycle stage of the document from the lifecycle determination service 142. The collaboration service 114 may include additional search parameters for identifying potential collaborators. The collaboration service 114 may optionally present a query parameter configuration GUI to the user, in some implementations, that allows the user to specify such additional search parameters. One such search parameter allows the collaboration service 114 to specify that the potential collaborators may be selected from certain operational units of the enterprise, organization, or school and/or may not be selected from certain operational units of the enterprise, organization, or school. Another such search parameter allows the user to specify a date or date range for selecting potential collaborators who have contributed to a document recently or during a predetermined period. The query parameter configuration GUI of the collaboration service 114 may be configured to allow additional query parameters in addition to or instead of those discussed above.

The search engine 160 may be configured to parse and execute the search query provided by the collaboration service 114 to identify potential collaborators. The search engine 160 may be configured to search for potential collaborators by searching document metadata and/or document properties of other documents associated with the organization, enterprise, or school. The other documents and/or document metadata may be stored in one or more data stores, such as the data store 152, that may be accessed by the search engine 160. The search engine 160 may obtain information identifying collaborators to the other documents, and document activity levels associated with the collaborators. The search engine 160 may also access collaborator-specific information to identify potential collaborators who may have subject matter expertise related to the subject matter of the document for which collaborators are being sought. The collaborator-specific information may also be obtained and/or derived from one or more remote or local services, such as a directory service, a collaboration service, and a communication service. In an example, the search engine 160 may be configured to utilize the Microsoft Graph platform to access a graph associated with the document that includes data from cloud-based services, such as but not limited to Microsoft Word, Microsoft Teams, Microsoft OneDrive, Microsoft Outlook, and/or other cloud-based services. The search engine 160 may be configured to perform a "graph walk" of the graph associated with the document to obtain information that may be used to identify potential collaborators. Examples of such services are discussed in the preceding examples. Examples of some of the types of data structures that may be searched by the search engine 160 are depicted in FIGS. 2, 3A, and 3B. The information stored by each of these example data structures are described in detail below.

Once searching and/or walking or otherwise traversing the graph is completed, the search engine 160 may return a search results index containing a list of potential collaborators for the document. For each potential collaborator on the list, the search results index may indicate one or more properties for the potential collaborator. These properties may include subject matter expertise and collaborator-specific information. The collaborator-specific information associated with a potential collaborator may include: (i) information indicative of one or more subject matters in which the potential collaborator is a subject matter expert, (ii) information indicative of a level of expertise of the potential collaborator in a specific subject matter, and (iii) information indicative of the lifecycle stages at which the potential collaborator typically contributes. The level of expertise of the potential collaborator may be based on a self-assessed level of expertise provided by the potential collaborator, and/or based on a crowdsourced assessment of subject matter expertise that may be derived from inputs received from other people and or inferred from. The information indicative of the lifecycle stages at which the potential collaborator typically contributes may include a frequency with which the potential collaborator contributes at each lifecycle stage. In some implementations, the frequency with which the potential collaborator contributes may be further broken down by subject matter, so that the frequency information expresses both the frequency with which the potential collaborator contributes for a particular lifecycle stage and subject matter.

The returned search results index may include a large number of search results that satisfy the parameters of the search request. If the collaboration service 114 were to submit the list of all the search results to the client device 120, a significant amount of memory, processing power and bandwidth may be needed. Furthermore, once the results are presented to the user, it may take the user a significant amount of time to review all the search results to select one or more potential collaborators. To mitigate this, among other benefits, the present techniques utilize the ranking engine 162 to rank the potential collaborators included in the search results based on the several factors that may indicate their relevance to the document. The relevance of a particular potential collaborator may change over time as the document progresses through various lifecycle stages and the expertise and/or experience of the collaborators for the current lifecycle stage of the document more closely aligns or less closely aligns with the experience of the potential collaborator. The ranking engine 162 may rank the identified potential collaborators based on various factors indicative of the potential collaborators being a good match as a collaborator to the document. These factors may include, but are not limited to, the subject matter expertise of the potential collaborators, the lifecycle stages at which the potential collaborators typically contribute and/or the activity levels associated with the respective potential collaborator associated with each lifecycle stage, the social and/or professional network connections between the author(s) and/or creators of the document and the potential collaborators, among other factors. The ranking engine 162 may compute a relevance score for each of the potential collaborators based on these factors and subsequently rank the search results from the search engine 160 based on the computed scores.

The collaboration service 114 may infer social and/or professional distance information for potential collaborator(s) that may be used by the ranking engine 162 to rank potential collaborator(s) based on their personal and/or professional relationships with the author(s) and/or creator(s) of the document. The social and/or professional network connection(s) between the author(s) and/or creator(s) of the document and the potential collaborator(s) may be analyzed to infer a "social distance" and/or a "professional distance" of the author(s) and/or creator(s) from the potential collaborator(s). The social distance may represent how close of a personal relationship that may exist between the author(s) and/or creator(s) of the document and the potential collaborator(s). The professional distance may represent how close a professional relationship that may exist between the author(s) and/or the creator(s) of the document and the potential collaborator. The inferring of the social and/or professional distance information is described in detail in the '655 Application.

The ranking engine 162 may utilize the social and/or professional distances when computing the relevance score for each of the potential collaborators and rank potential collaborators who have a closer social and/or professional distance higher than those having a lower social and/or professional distance. For example, the author(s) and/or creator(s) may have a closer professional distance to a first potential collaborator in the same team or group of an organization as the author(s) and/or creator(s) than to a second potential collaborator in a different division of the organization. Thus, the ranking engine 162 may rank the first potential collaborator higher than the second potential collaborator based on the professional distance.

An example of one such relevance score is a weighted sum computed by multiplying a relevance value associated with each of the factors associated with the potential collaborator by a weight associated with that factor. The weights assigned to each of the factors may be hardcoded, may be configurable by the user via the query parameter configuration GUI, may be determined by an ML model associated with the search engine 160 and may be modified over time as the ML model is fine-tuned, and/or may depend on the lifecycle stage of the document. The resulting weighted values of each of the factors may be summed up to determine the relevance score for the potential collaborator.

Once the relevance score is computed, the potential collaborators may be ranked relative to other potential collaborators, based on the calculated relevance score. Depending on the number of potential collaborators in the search results index, a portion of (or a specific number of) the search results having the highest scores may be provided to the collaboration engine 164. In one implementation, the relevance scores may also be used by the collaboration engine 164 in organizing and prioritizing the potential collaborators presented to the user, with the potential collaborators having higher relevance scores being displayed higher in the list. Thus, the ranking engine 162 may receive the search results index as an input and may provide the ranked search results to the collaboration engine 164 for further use. In some implementations, such as where the user is accessing an application 112 on the server 110, the search results or a portion thereof may be displayed on the client device 120 via the user agent 122. For example, the search results index or a portion thereof may be presented to the user via a browser tab or browser window.

Figure 1B:
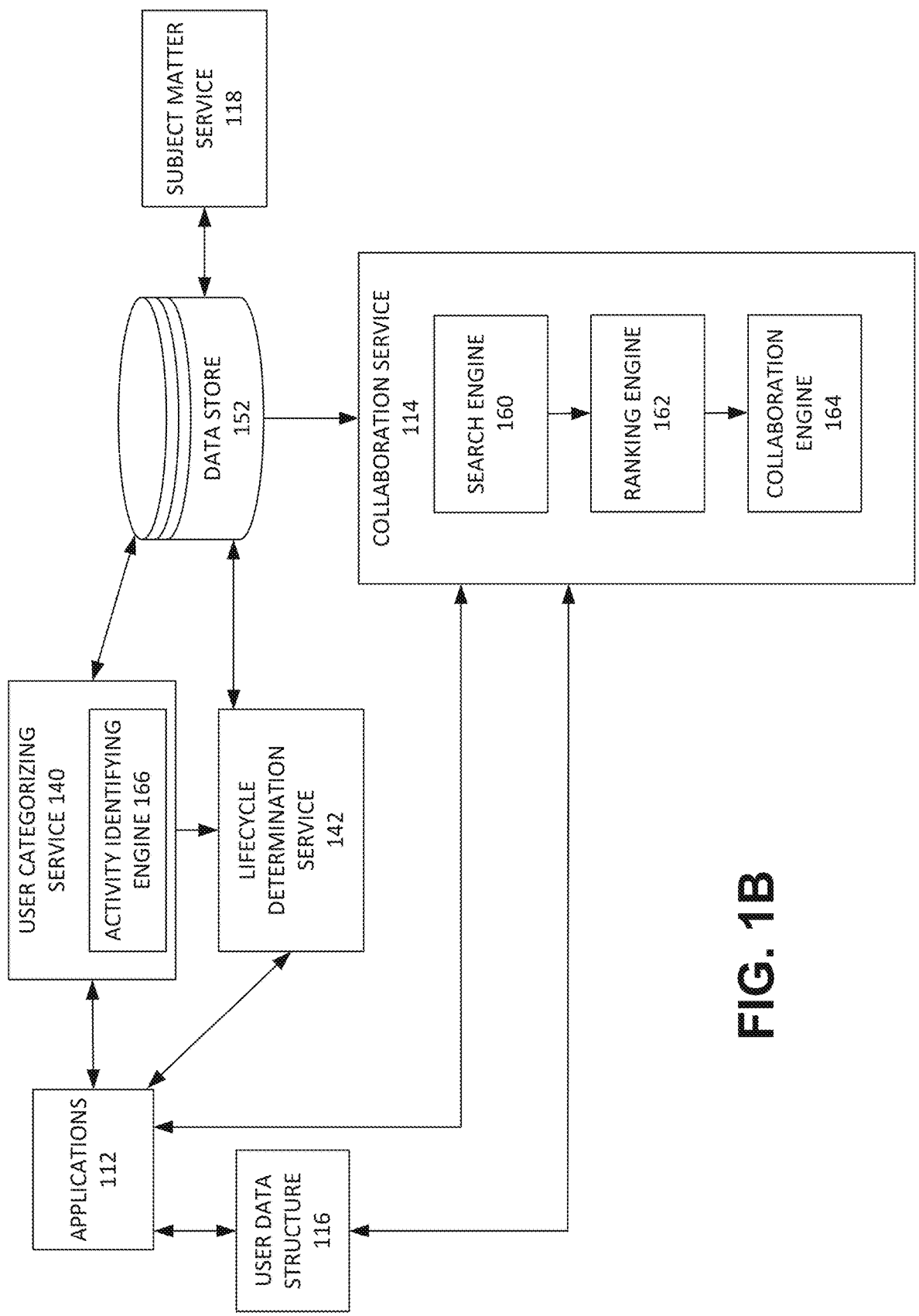

The local user categorizing engine 124, lifecycle determination engine 128, collaboration engine 132 and/or subject matter engine 134 of the client device 120 (in FIG. 1A) may include similar elements and may function similarly to the user categorizing service 140, lifecycle determination service 142, collaboration service 114 and/or subject matter service 118 (as depicted in FIG. 1B).

Figure 1C:
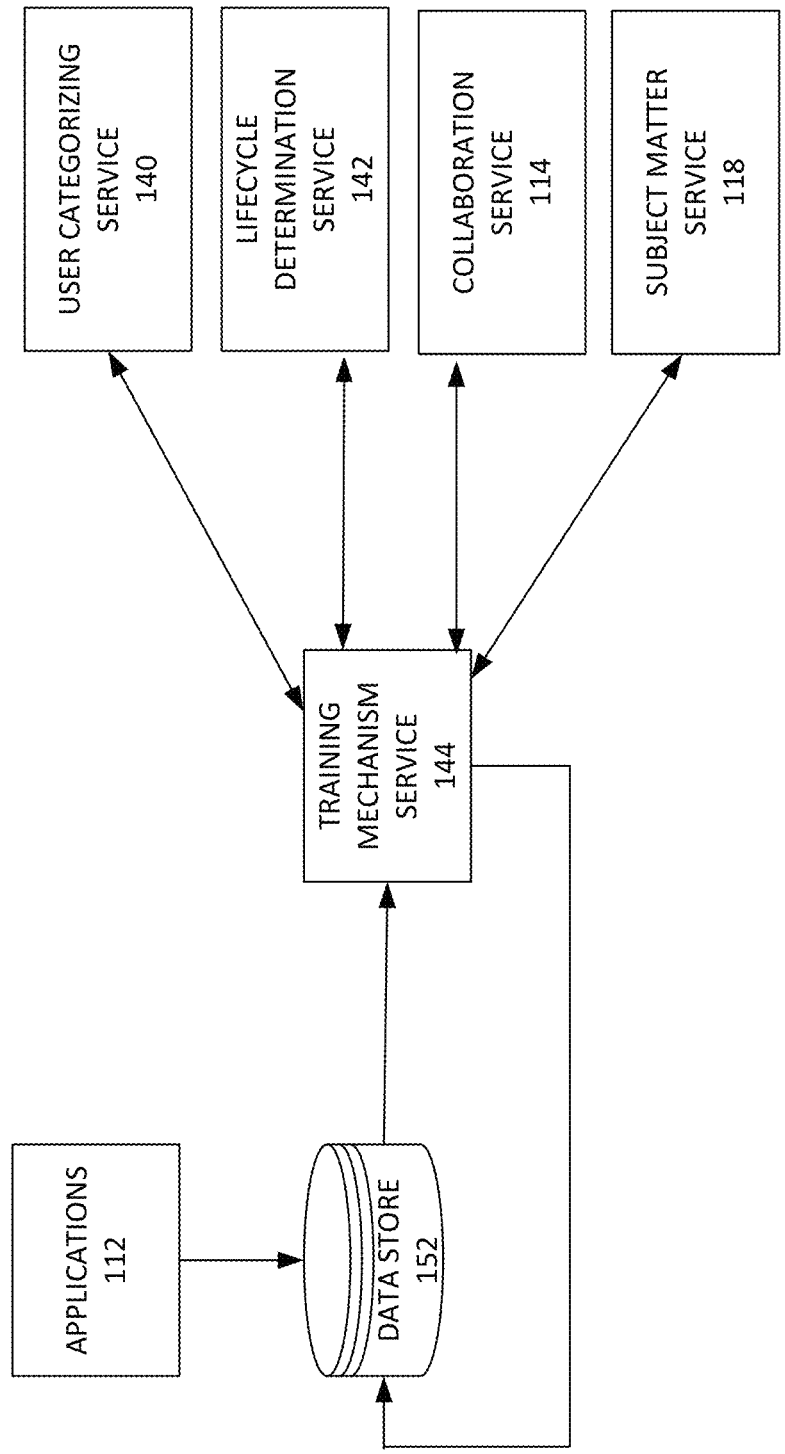

FIG. 1C depicts how one or more ML models used by the user categorizing service 140, lifecycle determination service 142, collaboration service 114, and/or subject matter service 118 may be trained by using the training mechanism service 144. The training mechanism service 144 may use training data sets stored in the data store 152 to provide initial and ongoing training for each of the models included in the user categorizing service 140, lifecycle determination service 142, collaboration service 114 and/or subject matter service 118. For example, each of the search engine 160, ranking engine 162, and collaboration engine 164 may be trained by the training mechanism service 144 using corresponding data sets from the data store 152. To provide ongoing training, the training mechanism service 144 may also use training data sets received from each of the ML models. Furthermore, data may be provided from the training mechanism service 144 to the data store 152 to update one or more of the training data sets to provide updated and ongoing training. Additionally, the training mechanism service 144 may receive training data such as knowledge from public repositories (e.g., Internet), knowledge from other enterprise sources, and/or knowledge from other pre-trained mechanisms.

FIG. 2 depicts an example data structure 200, such as a database table, for keeping track of user activity within a session during which the user performs activities on the document. For example, data structure 200 may include a session start time 210 and a session end time 240. The session start time 210 may be marked as the time the user opens a document and/or the time the user returns to an open document after an idle period. The session end time 240, on the other hand, may be marked as the time the document is closed or the time the last user activity occurs before the document becomes idle. In between the session start time 210 and the session end time 240, the data structure 200 may be used to keep track of user activities by recording activity identifiers 230 (e.g., TCIDs) associated with each separate user activity. Furthermore, in order to identify the user who performs the activities, the data structure 200 may store the user ID 220 of the person interacting with the document.

In some implementations, in addition to storing the user activity identifier 230, information about the activities performed may be stored. This may be done for specific predetermined activities. For example, authoring (e.g., writing one or more sentences in a word processing application) may be identified as a predetermined activity. In some cases, one or more ML models may be used to determine the subject matter of the content authored by the user. This may be achieved by utilizing natural-language processing algorithms, among others. The subject matter may then be stored in the subject matter field 235 in the data structure 200. For example, when user activity identifier 30010 is determined to relate to authoring a paragraph, the application may utilize one or more ML models to identify the subject matter of the new paragraph to include in the subject matter field 235. The subject matter service 118 and/or the subject matter engine 134 of FIG. 1A may analyze the new paragraph added to the document to identify the subject matter of the newly added content. The subject matter of the newly added content may be associated with the collaborator that added the content to the document. This approach helps track the subject matter expertise of each of the collaborators. This information may be transmitted as part of the usage signal and stored with the document as a property for future use in determining the subject matter expertise of the various collaborators.

Alternatively or additionally, the subject matter service 118 and/or the subject matter engine 134 may analyze the entire document to determine the subject matter or subject matters of the document, and the subject matter information may be stored in a data structure associated with the document. For example, a subject matter data structure may be used to track the subject matter(s) in the document. Each segment, section, or component of the document may be associated with specific subject matter. The subject matter data structure may include information indicating the location of each of the relevant subject matters in the document, such as an identifier of the segment, section, or component associated with the subject matter(s). These indicators may include but are not limited to paragraph numbers, page numbers, slide numbers, sheets, or other indications where the subject matter may be found in the document.

Once a determination is made that a session end time has been reached, the information collected during the session may be transmitted as part of the usage signal to the user categorizing service 140 and/or the lifecycle determination service 142. The user categorizing service 140 and/or the lifecycle determination service 142 may use the information to identify one or more user categories for the corresponding session, one or more relevant document activities performed on the document, a lifecycle stage for the document and/or the level of activity for the document. The usage signal may be a high-fidelity signal, which includes detailed information about the types of activities performed on the document within a given time period.

After the usage signal has been used to generate a user category signal, the user category signal may be transmitted back to the application and/or to the storage medium storing the document. In one implementation, the user category signal may include the identified user category, the file ID, the user ID, the session date and time, and/or the session length. In some implementations, the user category may also include the subject matter(s) identified and stored in the usage signal.

The user category provided as part of the user category signal may be the category identified as being associated with the user's activity. In some implementations, the user categories may include one or more of creator, author, reviewer, moderator, and reader. The file ID may be a file identifier that can identify the document with which the user activity is associated. This may enable the user category signal to be attached to the document. In one implementation, the user category signal is stored as metadata for the document. The user ID may identify the user who performed the user activities during the session. This may enable the system to properly attribute the identified category of activities to the identified user. The session length may be the length of the active session and may be stored and used as a property related to potential collaborator relevance.

The user category signal, activity level, lifecycle stage, subject matter of all or a portion of the document and/or relevant document activities that are identified in the session may be transmitted to the storage medium to be stored for future use. In an example, new properties for the document may be stored (e.g., in a folder associated with the document) based on the user category signal, activity level, lifecycle stage, relevant document activities and/or subject matters. The properties may be configured for propagation to secondary documents, in whole or in part. In this manner, a copy made of the document may inherit some or all the properties of the original document. The document may be associated and Access Control List (ACL) that defines a list of access permissions for with the document. The ACL may define a list of who may access the document, modify the document, share the document, derive other documents from the document, with whom the document may be shared, and/or other access permission for controlling how the document may be used. The ACL may also define who may access user-specific and/or collaborator-specific information associated with the document, such as the user category signal, activity level, lifecycle stage, subject matter information, and/or relevant document activities information associated with all or a portion of the document. The user-specific and/or collaborator-specific information may be removed from and/or disassociated with the document if the document is shared in a manner in that is not permitted by the ACL. For example, the ACL may permit the sharing of the document within an enterprise, but the sensitive collaborator information is disassociated with the document responsive to the document being shared outside of the enterprise. Other types of access controls may also be added to the document.

FIGS. 3A-3B depict example properties associated with a document that may be used to provide intelligent identification of potential collaborators. These properties may also be used to provide proactive recommendations to a collaborator whether a particular document requires their attention. FIG. 3A depicts a data structure 300A, such as a database table, containing information for activities related to a document which may be used to identify potential collaborators. The information may also be used keep track of the contributions that collaborators have made to the document and to provide proactive recommendations to collaborators associated with the document. The data structure 300A may include a file name 310, a level of activity 320 and a lifecycle stage 330. The file name 310 may be the file name utilized to store the file. Alternatively, the file name may be a file ID (e.g., a file identifier that is different than the file name) used to identify the document. In one implementation, the file name includes information about the location at which the document is stored. Alternatively or additionally, the properties retrieved may include a link to the storage location at which the document is stored. The document may, for example, be stored in a document management system configured to store and manage electronic copies of documents. The document management system may be configured to control access to the document and may provide collaborators who have been invited to collaborate on the document access to the document. The document management system may confirm that a user is listed as a collaborator in the data structure 300B, which will be discussed in detail below, before permitting the user to access the document. Furthermore, the document management system may be configured to limit the access of the user to certain activities based on the user category associated with the user.

The level of activity 320 may contain an indication of one or more activity levels identified over time for the document. The activity levels may provide a history of how active the document has been. For example, activity levels may include non-active, low activity, active, very active, or extremely active. In some implementations, the level of activity 320 may include one activity level for the document based on the number of activities performed recently or based on all activities performed overtime on the document. For example, the level of activity 320 may only include an indication that the document is a very active document based on all document activities performed in the last month. The activity level on a document may be used for determining whether to notify a collaborator of the activity on the document. Documents having a high level of activity may indicate that many changes have been made to the document content and may be indicative of the need for collaborators to review the document.

The lifecycle stage 330 may contain a list of identified lifecycle stages of the document. The lifecycle stages may provide additional information for determining which lifecycle stages users typically contribute to and may be used to identify potential collaborators by the collaboration service 114. The lifecycle stages may also be used for determining whether to notify a collaborator of collaborator activity on a document and/or for ranking or prioritizing the documents which may require the attention of a collaborator. For example, a creator or author of a document may be notified of all contributions made to a document at all lifecycle stages of the document. In contrast, a reviewer may not be interested in notifications regarding contributions made by other collaborators once they have completed their review of the document, but an editor may be interested in notifications that collaborators have made changes to the document that may require the editor to review at least the portions of the document that have been modified. The level of activity and the lifecycle stage information may be considered when determining whether to notify collaborators of contributions to the document and/or for ranking or prioritizing the document.

The data structure 300A may also include user categories 340 that have been identified for the document along with information relating to the user associated with each user category. For example, the user categories 340 may include the categories that have been identified for the document since its creation or for a particular time period and may include a user ID associated with each identified category. To allow for selection of the user categories based on their recency, the data structure 300A may also include the session date and/or time 350 for each identified user category.

The data structure 300A may also include a session duration 360, which may indicate a session length for each session, when applicable. The session duration 360 may only apply to activities that are substantial or meaningful for the document and may represent an amount of time spent on such an activity. The session duration may be application specific and may vary from application to application. For example, the amount of time creating a document (e.g., creating a blank document and storing it) may not be relevant and as such may not be stored and/or retrieved. The session duration, when provided, may directly relate to the utility of the document. As such, the session duration may have a weight associated with it for determining the user category. The session duration may be used when ranking potential collaborators. Potential collaborators who have spent more time on a particular activity or set of activities that are relevant to the lifecycle stage of the document may be ranked higher than those who have spent less time on similar activities. The session duration 360 may also be used when determining whether to notify a collaborator of collaborator activity on a document and/or for ranking or prioritizing the documents which may require the attention of a collaborator. A longer session duration 360 may be indicative of more significant and/or extensive changes may have been made to the document.

The data structure 300A may also include subject matters 325 and document sections 335. The document sections 335 may include an identifier of the document segment(s), section(s), and/or components on which the user performed an activity, and the subject matters 325 may include an identifier of the subject matter(s) of the document sections on which the user performed the activity. The subject matters 325 information may be used to identify subject matter expertise of potential collaborators. The document sections 335 information may be used to identify potential collaborators who have particular types of experience, such as editing a chart, video, image, formatting textual content, and/or other types of experience that may be useful for identifying potential collaborators.

FIG. 3B illustrates a data structure 300B, such as a database table, for storing an indication of one or more collaborators for a given document. Data structure 300B may include a file name 310, lifecycle stage 330, user categories 340, user alias 345, and user IDs 390 associated with each lifecycle stage 330. As discussed with respect to FIG. 3A, the file name 310 may be the file name utilized to store the document or a file ID used to identify the document. The collaboration service 114 may add an entry for each collaborator of the document to the data structure 300B. Each entry may include a user alias 345 and/or a user ID 390 associated with the collaborator. The user alias 345 may be a username, email address, or other identifier associated with the potential collaborator, and the user ID 390 may be a unique identifier associated with each collaborator. The user ID 390 may be generated by the collaboration service 114 when the collaborator is added to a document for the first time. The collaboration service 114 may also create a record in a collaborator details data structure (not shown) that includes additional details about the collaborator, such as contact information, operational entity of the organization, enterprise, or school with which the potential collaborator is associated, and/or other information.

The data structure 300B may also include a lifecycle stage 330 of the document for which the collaborator is associated or has been invited to participate. A collaborator may be involved in more than one lifecycle stage of the document. For example, User A is both an author associated with the authoring stage and a creator associated with the creating stage of the document. A user may also have more than one user category associated with a particular lifecycle stage. For example, User D is involved in the reviewing stage of the document as a reviewer. However, the User D may also be assigned another user category of formatter, where the reviewer may provide comments on the content of the document while the formatter may refine the formatting of the document to improve the presentation of the document. The user categories assigned to each of the collaborators are specific to the document. A collaborator may be assigned a different user category or user categories with respect to other documents to which the collaborator has contributed.

In some implementations, the data structure 300B may be used by the collaboration service 114 and/or the collaboration engine 132 to determine whether a particular collaborator has been invited to contribute to a particular document. To this end, the collaborators who are not included in the data structure 300B may be limited to a reading role for the document and not be permitted to author or edit content of the document. Some implementations may restrict reading of the document to those invited as a reading role. This approach may be used to prevent users who have not been invited to contribute to the document from altering, commenting on, or reading the content of the document under development.

In some implementations, the data structure 300B may be used to determine which collaborators have contributed to a document, and in combination with the information stored in the data structure 300A, how and when each of the collaborators have contributed to the document. This information may be used to determine which collaborators may be notified of contributions by other collaborators and when to notify in the collaborators of these contributions.

FIGS. 4A-4D are example GUI displays for presenting collaborator information of potential collaborators for a document and for inviting one or more potential collaborator(s) to collaborate on the document. The collaboration service 114 and/or the collaboration engine 132 of FIG. 1A may have identified the potential collaborators as described in the preceding example implementations. The GUIs depicted in FIGS. 4A-4D may be rendered on the client device 120 by the user agent 122 or the application 126.

FIG. 4A depicts GUI 400A which may be displayed by the user agent 122 or the application 126 in response to a user creating and/or editing the electronic document 130. The GUI 400A may be accessed from user agent 122 and/or the application 126 in response to the user clicking on or actuating a button or other UI element or interacting with the GUI 400A. The client device 120 may also support voice activation and the user may issue voice commands to interact with the GUI 400A. The user may select a "Find Collaborators" option from a search menu displayed by the user agent 122 and/or the application 126. In some implementations, the collaboration service 114 or the collaboration engine 132 may automatically cause the GUI 400A to be displayed in response to a user creating or editing the electronic document 130. The collaboration service 114 or the collaboration engine 132 may identify potential collaborators to the electronic document 130 and display a list of the potential collaborators to the user.

The GUI 400A displays information for three potential collaborators to the document. Alternatively, the GUI 400A may be configured to display a greater or fewer number of potential collaborators based on the number of potential collaborators identified by the collaboration service 114 or the collaboration engine 132 and other factors such as the size of the GUI 400A. The information for the potential collaborators in this example includes the name of the potential collaborator and an operational entity of the organization, enterprise, or school with which the potential collaborator is associated. Alternatively or additionally, the GUI 400A may display other information about the potential collaborators, such as the subject matter expertise of the potential collaborators and/or the lifecycle stages at which the potential collaborators typically contribute. Furthermore, the potential collaborators may be ranked by a ranking engine, such as the ranking engine 162, so that potential collaborators whose subject matter expertise and/or experience contributing to lifecycle stages of documents that most closely match the subject matter of the document and/or the current lifecycle stage of the document are displayed closer to the beginning of the list of potential collaborators.

The GUI 400A may include a "Cancel" button 410 that, when clicked or otherwise actuated by the user by voice command or other means, closes the GUI 400A and may return the user to the electronic document. The GUI 400A may also include an "Invite" button 405 that, when clicked or otherwise actuated by the user, may cause the GUI 400D depicted in FIG. 4D to be displayed by the client device 120.

FIG. 4D depicts GUI 400D, which may guide the user through drafting and sending an invitation to one or more potential collaborators. The GUI 400D may include default invitation language that the user may customize before sending the message to the potential collaborators by clicking or otherwise activating the "Send Invitation" button 425. The GUI 400D may also include a "Cancel" button 430, that when clicked or otherwise actuated, causes the GUI 400D to be closed and may return the user to the electronic document. The collaboration service 114 or the collaboration engine 132 may cause to be sent an electronic message to the potential collaborator. The user information associated with the potential collaborator may include an email address, username, a network alias, a handle, or other contact information for the potential collaborator that the collaboration service 114 and/or the collaboration engine 132 may use to invite the potential collaborator. The collaboration service 114 and/or the collaboration engine 132 may, for example, generate an email addressed to the potential collaborator, and the email may include a link or other means for the potential collaborator to accept the invitation. In other implementations, the collaboration service 114 may request an email application or other communications platform to send the invitation in an email message or other electronic message, or the collaboration engine 132 may send the invitation in an email message or other electronic message through an email application or other communications platform application.

The collaboration service 114 and/or the collaboration engine 132 may receive a response to the invitation from the computing device of the potential collaborator invited to contribute to the document. If the response reflects acceptance, the collaborator may be added to the data structure 300B, which may be used to keep track of the collaborators associated with the document. In some implementations, the collaboration service 114 and/or the collaboration engine 132 may add a potential collaborator to the data structure 300B associated with a document responsive to an invitation being sent to the potential collaborator. In some implementations, the data structure 300B may include an additional column (not shown) that includes a flag indicating whether the potential collaborator has accepted the invitation to contribute to the document. In such an implementation and upon receiving an indication that the invitation has been accepted, the collaboration service 114 and/or the collaboration engine 132 may update the record associated with the potential collaborator to indicate that the potential collaborator has accepted the invitation and is now a collaborator for the document.

FIG. 4B depicts another example GUI 400B which is similar to the GUI 400A but depicts the invitation being sent during a later lifecycle stage of the electronic document 130. The GUI 400A depicts a list of potential collaborators who may contribute to the authoring lifecycle stage of the electronic document 130, while the GUI 400B depicts a list of potential collaborators who may contribute to the reviewing lifecycle stage of the electronic document 130. Consequently, the GUI 400B depicts a different list of potential collaborators than those displayed on the GUI 400A. The potential collaborators suggested in the list depicted on the GUI 400B have been selected from potential collaborators who may have subject matter expertise relevant to the subject matter of the electronic document 130 and who may have experience contributing to documents during the reviewing lifecycle stage of the document.

Figure 4C:
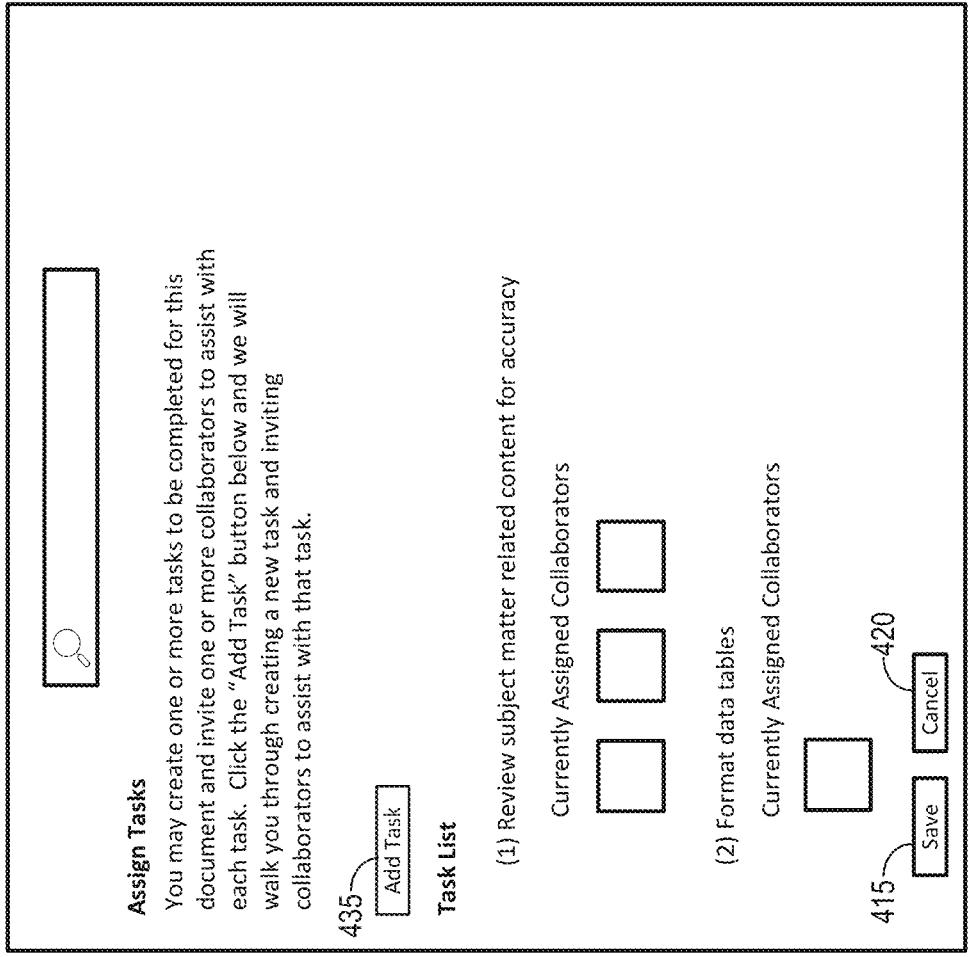

FIG. 4C depicts another example GUI 400C that may be used to assign tasks to the potential collaborators. The GUI 400C shows a list of tasks and collaborators or potential collaborators assigned to those tasks. The GUI 400C may allow the user to add a new task to be associated with the document. For example, the user may click or otherwise activate the "Add Task" button 435. The task may represent work to be done on the document. The task may be selected from a predetermined set of tasks, and the GUI 400C may provide a dropdown list or other means for selecting one of these predetermined tasks. The GUI 400C may also allow the user to define a new task by entering the task description in a text field. The GUI 400C may include an "Invite User" button (not shown) that may be used to invite a collaborator to contribute to the electronic document 130 by performing a specified task or tasks associated with the electronic document 130. The user may click or otherwise activate the "Invite User" button to cause a GUI similar to GUI 400A or 400B to be displayed. The GUI may present to the user a list of potential collaborators and allow the user to send an invitation to one or more of the potential collaborators to collaborate on the document by performing a specified task or tasks. The GUI 400C may include a "Save" button 415, that when clicked or otherwise activated, causes the task information to be saved. In other implementations, the task information may be saved automatically in response to a user adding or editing a task associated with the document. The GUI 400C may also include a "Cancel" button 420 that when clicked or otherwise activated causes the GUI 400C to be closed and may return focus to the electronic document.

The UI elements such as the ones displayed in GUI displays 400A-400D may be presented as part of a variety of applications. For example, such displays may be presented when the user first launches a word processing application or creates a new document in the word processing application. In yet another example, the displays 400A-400D may be presented in response to the user activating a collaborator search option implemented in the applications 112 or 126.

FIGS. 4E-4G are example GUI displays for presenting collaborator activity information for documents for which the user is a collaborator, for enabling the user to obtain details of the collaborator activity, and to open a document on which there has been collaborator activity. The collaboration service 114 and/or the collaboration engine 132 of FIG. 1A may have identified the collaborator activity as described in the preceding example implementations. The GUIs depicted in FIGS. 4E-4G may be rendered on the client device 120 by the user agent 122 or the application 126.

FIG. 4E depicts an example GUI 400E that may be used to present documents on which the user is a collaborator and for which other collaborators have recently made contributions. The contributions by the other collaborators may be after the contributions made by the user. The GUI 400E may present a list of the documents that may include a document title, when the document has been modified, which collaborator or collaborators have contributed to the document and what that contribution was, when and what the user's most recent contribution was to the document, and/or other information that the user may use to determine whether the changes to the document require the user's attention. The entries may include an "Open Document" button, that when clicked or otherwise actuated, causes the document to be opened in an application in which the document was created or is otherwise suitable for viewing and/or editing the document. The entries may include a "Details" button, that when clicked or otherwise actuated, causes the collaborative activity details user interface to be opened in an application in which the document was created or is otherwise suitable for viewing and/or editing the document. FIG. 4G, which is discussed in detail below, depicts an example GUI 400G for presenting collaborative activity details for the document. The GUI 400E may also include a "Sort by" option that allows the user to select an order in which the list of documents is presented. For example, the documents may be sorted by most recently modified, by oldest modification to most recent modification, by document type, by activity type, by particular collaborators, and/or by other factors.

FIG. 4F depicts another example GUI 400F that may be used to present documents on which the user is a collaborator and for which other collaborators have recently made contributions. The example GUI 400F is similar to GUI 400E, but the example GUI 400F shows documents of only one type. For example, the GUI 400F may be displayed by a word processing application and the list of collaborative documents presented by the GUI 400F may be documents that have been created using the word processing application or may be documents that have been created using a different application but may be viewed and/or edited using the word processing application.

FIG. 4G depicts another example GUI 400G that may be used to present collaborative activity details for a document. The collaborative activity details may include information identifying the contributions that were made to the document over time. This information may include the type of contribution made by the collaborator(s), the name and/or other identifier of the collaborator who made the contribution(s), and/or the date and time the contribution was made by the collaborator(s). The GUI 400G may provide a summary of the activity details to the user that allows the user to quickly determine whether the contributions made by other collaborators require the user's attention. The GUI 400G may include an "Open Document" button, that when clicked or otherwise activated, causes the document to be opened in an application in which the document was created or is otherwise suitable for viewing and/or editing the document.

The UI elements such as the ones displayed in GUI displays 400E-400G may be presented as part of a variety of applications. The GUI display 400E-400G may be presented in an application used to create a collaborative document. For example, such displays may be presented when the user first launches a word processing application to provide information regarding documents to which the user has contributed and to which other collaborators have subsequently contributed. The GUI displays 400E-400G may be presented on an application hub or a productivity application that may present information to the use regarding documents on which the user has collaborated to proactively notify the user of contributions to those documents that may require the attention of the user. In yet another example, the displays 400E-400G may be presented in response to the user activating a collaboration status option implemented in the applications 112 or 126. The document status option may present information indicating contributions made to the document, when the contributions were made, and which collaborator made the contribution.

In yet another example, the information provided via the GUI displays 400E-400G may be delivered to the user in a message via email or other messaging platform instead of or in addition to displaying the information via the GUI displays 400E-400G. Such messages may include a summary of activity for collaborative documents on which the user was a collaborator and may be generated periodically and sent to the user. For example, the messages may be generated daily, weekly, or at another frequency. The frequency at which messages are sent to the user may be a default setting which applies to all users and ay be configurable by an administrator. In some implementations, individual users may be able to configure user-specific settings to customize the frequency at which these messages are sent to the user. In some implementations, the messages may be generated based at least in part when certain activity parameters or thresholds being reaches associated with a collaborative document. For example, the activity parameters may notify a user of activity on a collaborative document if there are more than a first number of instances of authoring associated with the document, if there are more than a second number of instances of revising of the document, if there are more than a third number of instances of commenting on the document, or if there are a more than a fourth number of instances of reading of the document. Other activities in addition to these may be monitored and may have an associated threshold amount of activity that triggers the generation of a message to the user. The messages may also be generated in response to the user's own activities. For example, the user may have been out of office for a period of time, inactive on a collaborative document for a period of time, and/or perform or not perform certain actions for period of time to cause the message to be generated and sent to the user. These messages may keep the user up to date on the status of collaborative documents on which the user has collaborated.

Figure 5:
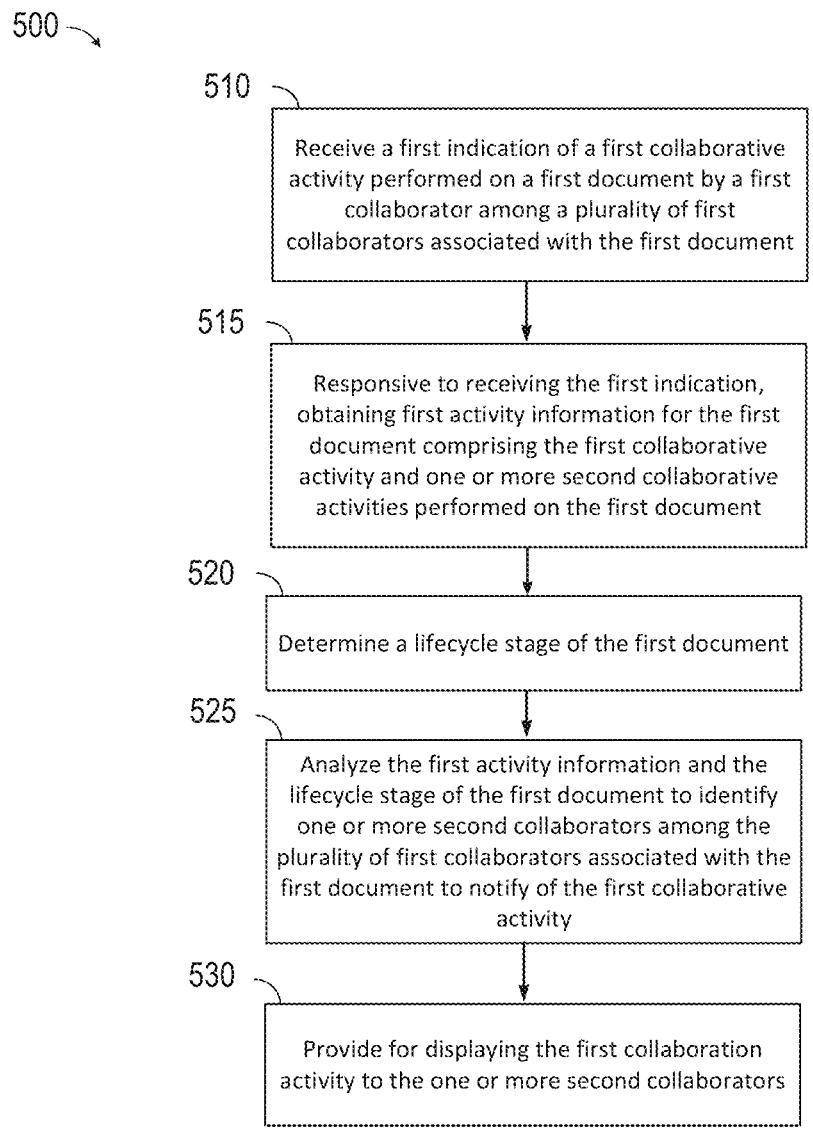
FIG. 5 is a flow diagram depicting an exemplary method for intelligently identifying potential collaborators for collaborating on a document.

FIG. 5 is a flow diagram depicting an exemplary method 500 for intelligently notifying collaborators of activity on collaborative content. The method 500 may be performed by a collaboration service or collaboration engine such as the collaboration service 114 or collaboration engine 132 of FIGS. 1A-1C. At 510, method 500 may begin with receiving a first indication of a first collaborative activity performed on a first document by a first collaborator among a plurality of first collaborators associated with the first document. The first indication of the first collaborative activity may be a usage signal associated with the document that indicates that the first collaborator has contributed to the document in some manner. The usage signal may include detailed information about the types of activities performed on a document by a user within a given time period. The first collaborator may have authored at least a portion of the first document, edited at least a portion of the first document, reviewed or commented on one or more portions of the first document, and/or performed other actions on the document which may require the attention of other collaborators associated with the first document. The usage signal data associated with the document may be stored in a datastore and/or may be stored in the document. The collaboration service 114 or collaboration engine 132 may monitor the usage signal data to detect changes to the documents that may require the attention of other collaborators to the documents.

At 515, the method 500 may continue with obtaining first collaborative activity information for the first document comprising the first collaborative activity and one or more second collaborative activities performed on the first document responsive to receiving the first indication. The collaboration service 114 may access the data stored in the data store, such as in data structure 300A, to obtain collaborative activity information for the first document. The collaboration service 114 may use this information to determine which collaborators have contributed to the lifecycle stages of the first document, when these contributions were made, which sections of the document on which the collaborators operated, and/or other collaborative activity information that may be analyzed by the collaboration service 114 to generate a prediction about whether a particular collaborator to a document should be notified of the first collaborative activity.

At 520, the method 500 may continue with determining a lifecycle stage of the first document. The lifecycle stage of the document may be determined based on the usage signal data associated with the document, including the first indication of a first collaborative activity performed on the first document by the first collaborator. As described further with respect to FIG. 2, the usage signal data may include detailed information about the types of activities performed on a document by a user within a given time period. The lifecycle stage of the document may be determined by the lifecycle determination service 142 and/or the lifecycle determination engine 128. The user category data may also be indicative of the lifecycle stage of the first document. The role of first collaborator may be indicative of lifecycle stage of the document. Certain activities performed on the document may be associated with each lifecycle stage of the document. New content being added to the document may be indicative of the document being in an authoring lifecycle stage. Adding comments to the document may be indicative of the document being in a reviewing lifecycle stage of the document. Since each of the lifecycle stages may involve different types of activities, the collaboration service 114 and/or the collaboration engine 132 may use the lifecycle stage information for the document to identify a set of potential collaborators who have experience performing the types of activities that are relevant to the lifecycle stage of the document for which collaborators are being sought.

At 525, the method 500 may continue with analyzing the first collaborative activity information and the lifecycle stage of the first document to identify one or more second collaborators among the plurality of first collaborators associated with the first document to notify of the first collaborative activity. In some examples, the collaboration service 114 and/or the collaboration engine 132 may present all changes to all collaborators on a collaborative document. However, not all activity on the document may be relevant to all collaborators associated with the document, so the collaboration service 114 and/or the collaboration engine 132 may analyze the first collaborative activity information associated with the document and the lifecycle stage of the document to determine whether to notify a particular collaborator of changes to the document. As indicated above, collaborators who participated in creation and/or authoring lifecycle stages of the document may be notified of contributions made by other collaborators in subsequent lifecycle stages of the document. For example, a creator and/or an author of the document may be interested in all activity on the document, but a reviewer of the document that provided comments on the document may not be interested in being notified of subsequent activity on the document. Furthermore, the collaborators who have contributed in a particular lifecycle stage of the document may be notified of subsequent activity on the document during that lifecycle stage of the document, because such activity may be relevant to the contributions made by those collaborators.

The collaboration service 114 and/or the collaboration engine 132 may provide the first collaborative activity information associated with the document and the lifecycle stage of the document to a ML model that has been trained to predict whether a particular user should be notified of the collaborative activity associated with a document. The ML model may be trained using data that is based on the collaborator activity at the various lifecycle stages of documents. The ML model may be configured to receive the first collaborative activity information associated with the document and the lifecycle stage of the document to predict whether a particular user is likely to contribute at a particular lifecycle stage of the document and should be notified of the first collaborative activity. The ML model may be configured to receive additional information as inputs that may be used to further refine the prediction. The collaboration service 114 and/or the collaboration engine 132 may also consider other factors when determining whether to notify a collaborator of changes to the document, such as but not limited to the role of each collaborator with respect to the first document, the document lifecycle stages at which each collaborator typically contributes to documents, the subject matter or subject matters of the document and the subject matter expertise of the collaborators, the activity level associated with the first document, user-specified general or document-specific preferences, and/or other factors that may be used to determine whether to notify a particular collaborator of changes to the document.

Upon identification of the one or more second collaborators, the method 500 may provide display data to the one or more second collaborators at 530. The collaboration service 114 and collaboration engine 132 may cause the user agent 122 and/or the application 126 to render a GUI on a display of the client device 120, such as GUI 400E-400G depicted in FIGS. 4E-4G. As discussed above, the GUIs may collaborative activity information. The example GUI 400E and 400F are examples for which activity associated with multiple documents may be presented to a collaborator on those documents. The example GUI 400G provides details of the collaborative activity details associated with a particular document. The collaborator may review the information provided on GUIs 400E-400G to determine whether the collaborative activity on one or more documents may require attention of the collaborator.

The preceding examples demonstrate the significant advantages over currently used mechanisms for determining whether collaborative content has been modified and whether these modifications require the attention of a respective collaborator associated with the content. Current mechanisms typically involve a collaborator manually tracking the progress of each of these documents by individually accessing and opening each of these documents to determine whether there have been changes to the documents on which the user is a collaborator. However, the user may struggle to keep track of numerous documents using such an inefficient and time-consuming approach. Furthermore, such manual processing may consume significant processing, memory, and/or network resources as the user must continually track. Further, this approach may not be very accurate and may lead to missed opportunities to contribute to the document, as the author or contributor of the document may inadvertently overlook important changes to a document. The technical solutions described in the preceding examples provide an intelligent and efficient solution for notifying collaborators of collaborative activity on a collaborative document.

Figure 6:
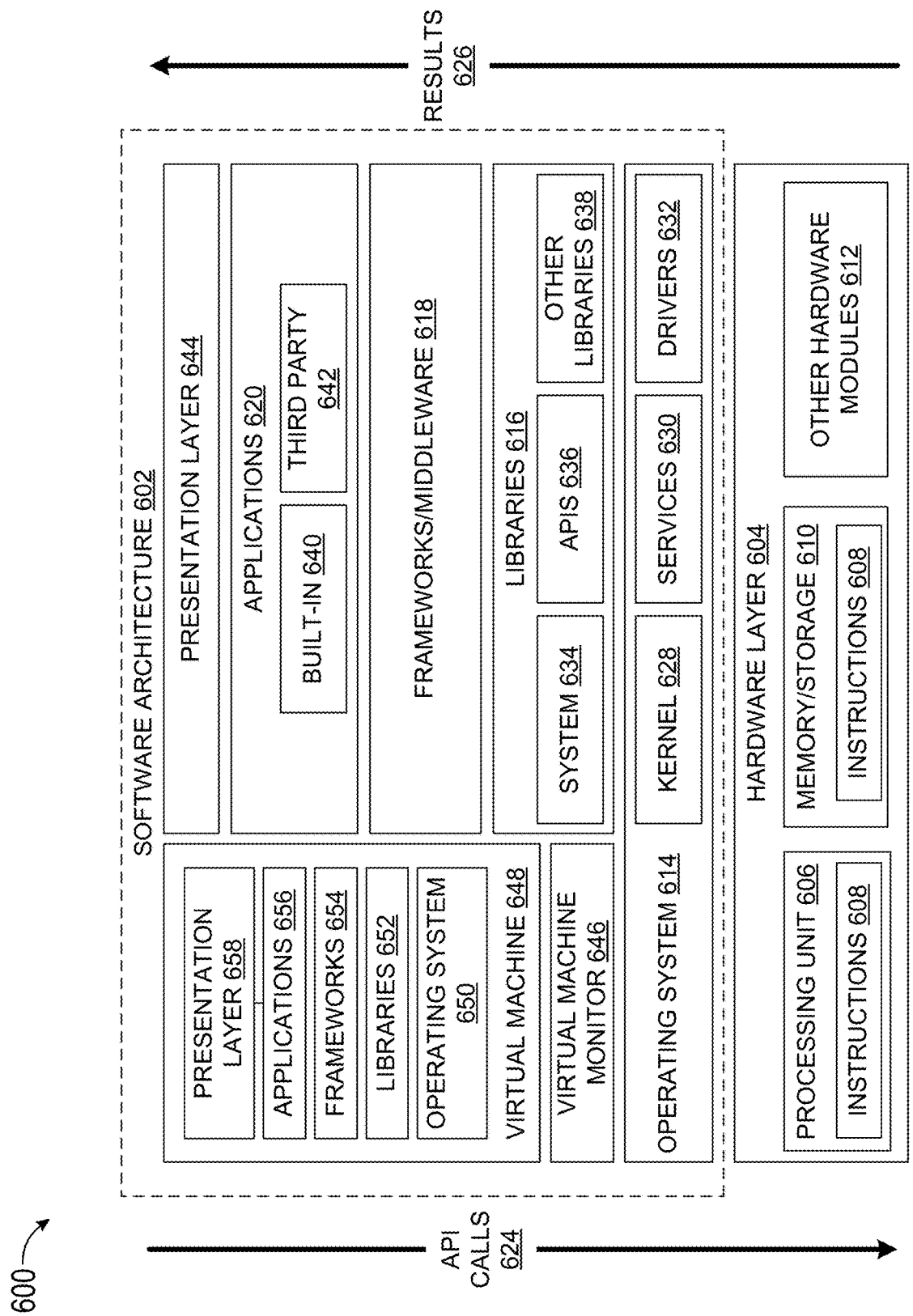
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various GUI functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 642 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
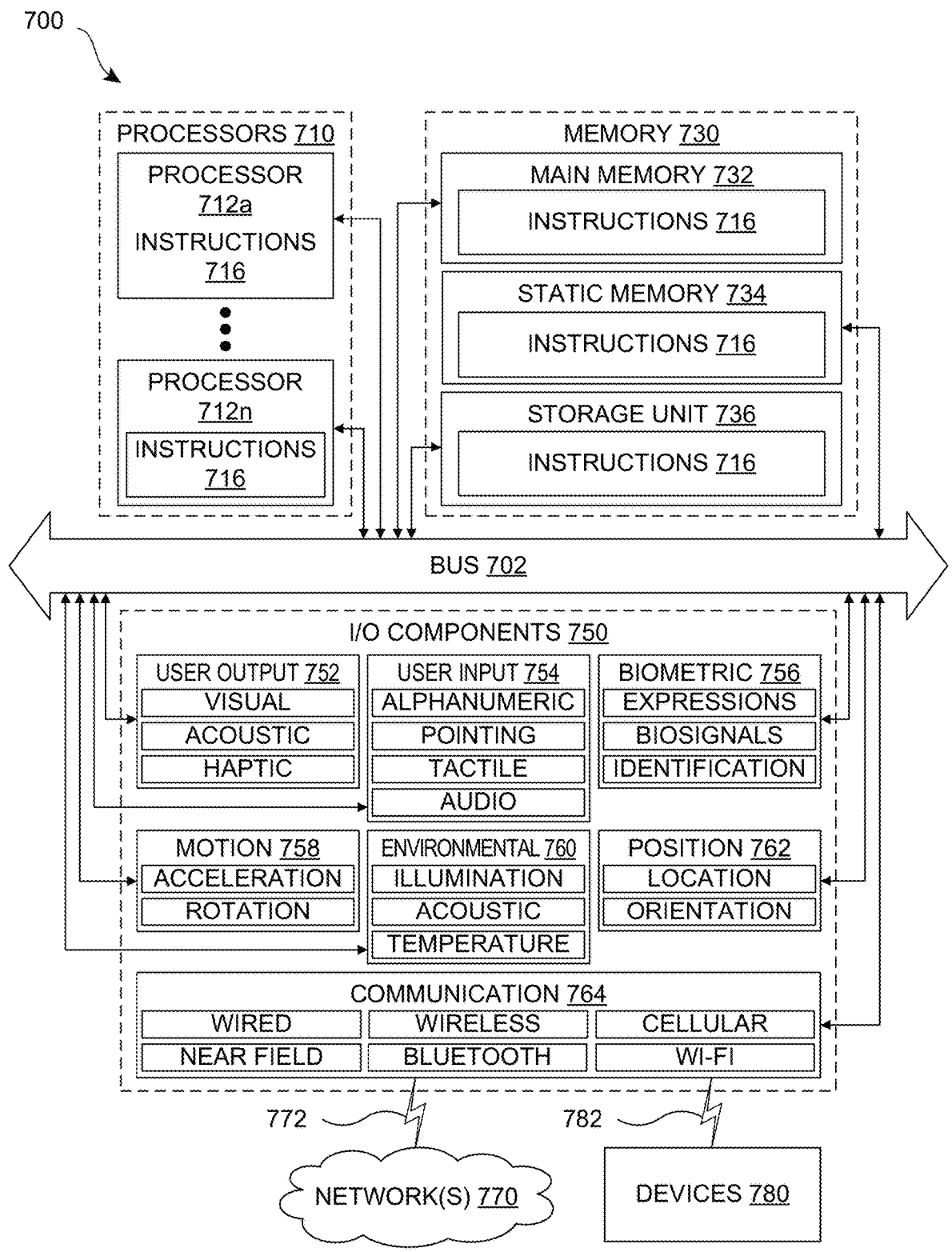
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system also referred to herein as a "programmable device," within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, storage 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "computer-readable medium" refers to a device able to temporarily or permanently store instructions and data that cause machine 700 to operate in a specific fashion. The term "computer-readable medium," as used herein, may include both communication media (e.g., transitory electrical or electromagnetic signals such as a carrier wave propagating through a medium) and storage media (i.e., tangible and/or non-transitory media). Non-limiting examples of a computer readable storage media may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable storage media" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "computer-readable storage media" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). In some examples, the I/O components 750 may include motion components 758 and environmental components 760. The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

As a general matter, the methods and systems described here may include, or otherwise make use of, a machine-trained model to identify data related to a document. ML generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model to identify patterns in a user activity, determine associations between tasks and users, and/or identify potential collaborators for a given document. Such training may be made following the accumulation, review, and/or analysis of user data from many users over time. Such user data is configured to provide the ML algorithm (MLA) with an initial or ongoing training set. In addition, a user device may be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the processor to perform functions of:
receiving a first indication of a first collaborative activity performed on a first document by a first collaborator among a plurality of first collaborators associated with the first document;
responsive to receiving the first indication, obtaining first activity information for the first document comprising the first collaborative activity and one or more second collaborative activities performed on the first document;
determining a lifecycle stage of the first document;
analyzing a first collaborative activity information and the lifecycle stage of the first document to identify one or more second collaborators among the plurality of first collaborators associated with the first document to notify of the first collaborative activity; and providing for displaying the first collaboration activity to the one or more second collaborators.

2. The data processing system of claim 1, wherein, to analyze the first activity information and the lifecycle stage of the first document, the memory includes further executable instructions that, when executed by the processor, cause the processor to perform functions of:

analyzing the first activity information and the lifecycle stage of the first document using a machine learning model trained to predict collaborators associated with the first document that are likely to perform one or more collaborative activities on the first document in response to the first collaboration activity; and obtaining, from the machine learning model, information identifying the one or more second collaborators among the plurality of first collaborators.

3. The data processing system of claim 2, wherein, to analyze the first collaborative activity and the lifecycle stage of the first document using the machine learning model, the memory includes further executable instructions that, when executed by the processor, cause the processor to perform functions of:

analyzing information indicative of lifecycle stages of documents during which the plurality of first collaborators typically contribute to the documents, the first collaborative activity, and the lifecycle stage of the first document with the machine learning model to predict the collaborators that are likely to perform the one or more collaborative activities.

4. The data processing system of claim 2, wherein the memory includes further executable instructions that, when executed by the processor, cause the processor to perform functions of:

determining a subject matter of the first document based at least in part on content of the first document, and wherein to analyze the first collaborative activity and the lifecycle stage of the first document using the machine learning model, the memory includes further executable instructions that, when executed by the processor, cause the processor to perform functions of:

analyzing the subject matter, the first collaborative activity, and the lifecycle stage of the first document with the machine learning model to predict the collaborators that are likely to perform the one or more collaborative activities.

5. The data processing system of claim 2, wherein the memory includes further executable instructions that, when executed by the processor, cause the processor to perform functions of:

determining a role associated with each of the plurality of first collaborators, and wherein to analyze the first collaborative activity and the lifecycle stage of the first document using the machine learning model, the memory includes further executable instructions that, when executed by the processor, cause the processor to perform functions of:

analyzing the role associated with each of the plurality of first collaborators, the first collaborative activity, and the lifecycle stage of the first document with the machine learning model to predict the collaborators that are likely to perform the one or more collaborative activities.

6. The data processing system of claim 2, wherein, to analyze the first collaborative activity and the lifecycle stage of the first document using the machine learning model, the memory includes further executable instructions that, when executed by the processor, cause the processor to perform functions of:

analyzing an activity level associated with the first document, the first collaborative activity, and the lifecycle stage of the first document with the machine learning model to predict the collaborators that are likely to perform the one or more collaborative activities.

7. The data processing system of claim 1, wherein the memory includes further executable instructions that, when executed by the processor, cause the processor to perform functions of:

receiving a second indication of a second collaborative activity performed on a second document by a third collaborator of a plurality of third collaborators associated with the second document;

responsive to receiving the second indication, obtaining second activity information for the second document comprising the second collaborative activity and one or more second collaborative activities performed on the second document;

determining the lifecycle stage of the second document;

analyzing the second collaboration activity and the lifecycle stage of the second document to identify one or more fourth collaborators of the plurality of third collaborators associated with the second document to notify of the second collaborative activity; and providing for displaying the second collaboration activity to the one or more fourth collaborators.

8. A method for intelligently notifying collaborators of activity on collaborative content comprising:

receiving a first indication of a first collaboration activity performed on a first document by a first collaborator among a plurality of first collaborators associated with the first document;

responsive to receiving the first indication, obtaining first activity information for the first document comprising the first collaborative activity and one or more second collaborative activities performed on the first document;

determining a lifecycle stage of the first document;

analyzing the first activity information and the lifecycle stage of the first document to identify one or more second collaborators among the plurality of first collaborators associated with the first document to notify of the first collaborative activity; and providing for displaying the first collaboration activity to the one or more second collaborators.

9. The method of claim 8, wherein analyzing the first activity information and the lifecycle stage of the first document further comprises:

analyzing the first activity information and the lifecycle stage of the first document using a machine learning model trained to predict collaborators associated with the first document that are likely to perform one or more collaborative activities on the first document in response to the first collaboration activity; and obtaining, from the machine learning model, information identifying the one or more second collaborators among the plurality of first collaborators.

10. The method of claim 9, wherein analyzing the first collaborative activity and the lifecycle stage of the first document using the machine learning model further comprises:

analyzing information indicative of lifecycle stages of documents during which the plurality of first collaborators typically contribute to the documents, the first collaborative activity, and the lifecycle stage of the first document with the machine learning model to predict the collaborators that are likely to perform the one or more collaborative activities.

11. The method of claim 9, further comprising:
determining a subject matter of the first document based at least in part on content of the first document, and wherein analyzing the first collaborative activity and the lifecycle stage of the first document using the machine learning model further comprises:
analyzing the subject matter, the first collaborative activity, and the lifecycle stage of the first document with the machine learning model to predict the collaborators that are likely to perform the one or more collaborative activities.

12. The method of claim 9, further comprising:
determining a role associated with each of the plurality of first collaborators, and wherein analyzing the first collaborative activity and the lifecycle stage of the first document further comprises:
analyzing the role associated with each of the plurality of first collaborators, the first collaborative activity, and the lifecycle stage of the first document with the machine learning model to predict the collaborators that are likely to perform the one or more collaborative activities.

13. The method of claim 9, wherein analyzing the first collaborative activity and the lifecycle stage of the first document further comprises:
analyzing an activity level associated with the first document, the first collaborative activity, and the lifecycle stage of the first document with the machine learning model to predict the collaborators that are likely to perform the one or more collaborative activities.

14. The method of claim 8, further comprising:
receiving a second indication of a second collaboration activity performed on a second document by a third collaborator of a plurality of third collaborators associated with the second document;
responsive to receiving the second indication, obtaining second activity information for the second document comprising the second collaborative activity and one or more second collaborative activities performed on the second document;
determining the lifecycle stage of the second document;
analyzing the second collaboration activity and the lifecycle stage of the second document to identify one or more fourth collaborators of the plurality of third collaborators associated with the second document to notify of the second collaborative activity; and
providing for displaying the second collaboration activity to the one or more fourth collaborators.

15. A computer readable tangible storage media on which are stored instructions that when executed cause a programmable device to perform functions of:
receiving a first indication of a first collaborative activity performed on a first document by a first collaborator among a plurality of first collaborators associated with the first document;
responsive to receiving the first indication, obtaining first activity information for the first document comprising the first collaborative activity and one or more second collaborative activities performed on the first document;
determining a lifecycle stage of the first document;
analyzing the first activity information and the lifecycle stage of the first document to identify one or more second collaborators among the plurality of first collaborators associated with the first document to notify of the first collaborative activity; and
providing for displaying the first collaboration activity to the one or more second collaborators.

16. The computer readable tangible storage media of claim 15, wherein, to analyze the first activity information and the lifecycle stage of the first document, the computer readable storage media further includes stored instructions that, when executed, cause the programmable device to perform functions of:
analyzing the first activity information and the lifecycle stage of the first document using a machine learning model trained to predict collaborators associated with the first document that are likely to perform one or more collaborative activities on the first document in response to the first collaboration activity; and
obtaining, from the machine learning model, information identifying the one or more second collaborators among the plurality of first collaborators.

17. The computer readable tangible storage media of claim 16, wherein, to analyze the first collaborative activity and the lifecycle stage of the first document using the machine learning model, the computer readable storage media includes further stored instructions that, when executed, cause the programmable device to perform functions of:
analyzing information indicative of lifecycle stages of documents during which the plurality of first collaborators typically contribute to the documents, the first collaborative activity, and the lifecycle stage of the first document with the machine learning model to predict the collaborators that are likely to perform the one or more collaborative activities.

18. The computer readable tangible storage media of claim 16, wherein the computer readable storage media includes further stored instructions that, when executed, cause the programmable device to perform functions of:
determining a subject matter of the first document based at least in part on content of the first document, to analyze the first activity information and the lifecycle stage of the first document, wherein the computer readable storage media includes further stored instructions that, when executed, cause the programmable device to perform functions of:
analyzing the subject matter, the first collaborative activity, and the lifecycle stage of the first document with the machine learning model to predict the collaborators that are likely to perform the one or more collaborative activities.

19. The computer readable tangible storage media of claim 16, wherein, to analyze the first collaborative activity and the lifecycle stage of the first document using the machine learning model, the computer readable storage media includes further stored instructions that when executed cause the programmable device to perform functions of:
determining a role associated with each of the plurality of first collaborators, and wherein to analyze the first collaborative activity and the lifecycle stage of the first document using the machine learning model, the computer readable storage media further includes executable instructions that, when executed by the programmable device, cause the programmable device to perform functions of:

analyzing the role associated with each of the plurality of first collaborators, the first collaborative activity, and the lifecycle stage of the first document with the machine learning model to predict the collaborators that are likely to perform the one or more collaborative activities.

20. The computer readable tangible storage media of claim 16, wherein, to analyze the first collaborative activity and the lifecycle stage of the first document using the machine learning model, the computer readable storage media includes further stored instructions that, when executed, cause the programmable device to perform functions of:

analyzing an activity level associated with the first document, the first collaborative activity, and the lifecycle stage of the first document with the machine learning model to predict the collaborators that are likely to perform the one or more collaborative activities.

\* \* \* \* \*